(12) United States Patent
Higgins et al.

(10) Patent No.: US 7,120,680 B1
(45) Date of Patent: Oct. 10, 2006

(54) METHODS AND APPARATUS FOR IDENTIFYING NETWORK CONFIGURATIONS IN AN EXISTING NETWORK

(75) Inventors: Joseph W. Higgins, Acton, MA (US); John F. Ackerley, Framingham, MA (US); Ryan S. O'Connell, Tewksbury, MA (US)

(73) Assignee: Sun Microsystems, Inc., Palo Alto, CA (US)

( * ) Notice: Subject to any disclaimer, the term of this patent is extended or adjusted under 35 U.S.C. 154(b) by 852 days.

(21) Appl. No.: 10/195,282

(22) Filed: Jul. 15, 2002

(51) Int. Cl.
*G06F 15/177* (2006.01)
(52) U.S. Cl. .................. 709/220; 709/223; 709/230
(58) Field of Classification Search ............... 709/220, 709/223, 230
See application file for complete search history.

(56) References Cited

U.S. PATENT DOCUMENTS 6,209,033 B1 *  3/2001  Datta et al. ................ 709/224

2002/0167898 A1 * 11/2002  Thang et al. ............... 370/216
2003/0105881 A1 *  6/2003  Symons et al. ............. 709/249

* cited by examiner

*Primary Examiner*—Khanh Dinh
*Assistant Examiner*—Nghi Tran
(74) *Attorney, Agent, or Firm*—Chapin IP Law, LLC; Barry W. Chapin, Esq.

(57) ABSTRACT

Mechanisms and techniques operate in a computerized device to provide a network analyzer that identifies a useable network configuration in an existing network configuration. The network analyzer receives a preferred network configuration defining a preferred network topology and analyzes an existing network configuration to produce an existing network topology. The network analyzer then compares the preferred network topology to the existing network topology, for example using a graph matching technique, to identify a useable network configuration within the existing network configuration that most closely supports operation of the preferred network configuration.

33 Claims, 9 Drawing Sheets

METHODS AND APPARATUS FOR IDENTIFYING NETWORK CONFIGURATIONS IN AN EXISTING NETWORK

FIELD OF THE INVENTION

The present invention generally relates to systems for performing network configuration, and more particularly, to systems, mechanisms and techniques that identify network configurations existing within an established or existing network topology.

BACKGROUND OF THE INVENTION

Conventional computer system and information networking technologies allow individuals to configure complex arrangements of networked components that can communicate with each other over data communications links. As an example, computer system manufacturers manufacture and sell multi-processor computer systems that can contain a large numbers of individual compute nodes. Each compute node may include a respective processor interconnected with a memory system and may be fully contained on a single processor board, card or blade. The computer system manufacturer can install a collection of such compute nodes within a rack-mounted enclosure to form the multi-processor computer system. Each compute node concurrently and independently operates, for example as a server, to process data and communicate with other compute nodes in the computer system over a network of data links. An example of such a multi-processor computer system that can be configured to contain as many as two hundred fifty six (256) internetworked compute nodes is the Wildcat Enterprise Server manufactured by Sun Microsystems, Inc. of Mountain View, Calif.

To allow the compute nodes to communicate with each other in a multi-processor computer system such as the Wildcat Enterprise Server, each compute node operates in conjunction with a communications interface card that employs one or more communications protocols. The communications interface card associated with a compute node contains one or more interface ports that can be interconnected with networking cables or data links (e.g., fiber optic cables) to interface ports of other communications interface cards associated with other compute nodes or with one or more switch nodes that operate as part of the multi-processor computer system configuration. A switch node operates to distribute communication messages (e.g., packets) between the compute nodes that couple to the switch node. In this manner, a multi-processor computer system such as the Wildcat Enterprise Server can operate a plurality of compute nodes interconnected via communications interfaces with other compute nodes or with switch nodes to form numerous complex networked configurations of interconnected compute nodes and switch nodes.

To illustrate the complexity that can be achieved with such arrangements, consider a fully configured multi-processor computer system containing as many as two hundred fifty six compute nodes. A multi-processor computer system administrator can configure groups of interconnected compute nodes to form sub-networks of compute nodes known as "domains." Depending upon the purpose or use of a domain of compute nodes, some domains may contain more or less compute nodes than others. In addition, sub-networks of compute node domains can be interconnected with each other. In a typical example configuration, a large number of data links (e.g., 50+ fiber-optic networking cables) can interconnect compute and switch nodes to create a complex network infrastructure domain within a single multi-processor computer system. Other domains (i.e., other groups of interconnected compute and switch nodes) may exist in the same multi-processor enterprise server. In addition, for high-reliability or high-bandwidth applications, an administrator can configure redundant connections (e.g., two or more data links) between communications interfaces associated with compute nodes and switch nodes to form even more complex network configurations.

According to certain multi-processor computer system design requirements, there may be interconnection configurations between compute nodes and/or switch nodes that are not allowed, or that may be required, for certain reasons. As an example, when an administrator desires to construct a redundant network configuration or ten or more compute nodes in a Wildcat Enterprise Server, and even number of compute nodes must be selected for such a configuration. As another example, certain compute nodes may operate in a buddy relationship with each other that requires the compute nodes to be concurrently configured in a parallel arrangement with other compute nodes when either buddy node is selected for a particular configuration. As an example, consider a scenario in which a first compute node and a second compute node operate in a buddy relationship with each other. If the communications interface associated with the first compute node is coupled or linked to another compute node (e.g., a third compute node), the second compute node that maintains the buddy relationship with the first compute node must also be coupled to a compute node (e.g., a fourth compute node) that operates in a buddy relationship with the third compute node. There may be many other configuration requirements that must be met in order for a domain of interconnected compute nodes to properly operate within a conventional multi-processor computer system such as the Wildcat Enterprise Server. The range of valid configurations of interconnected compute nodes is referred to as a set of legal network topologies.

Other types of conventional networking technologies related to the present invention include wide and local area network configurations such as corporate computer networks or the Internet. In such networking environments, many host computer systems (e.g., clients and servers) can be interconnected via a networking fabric of data links that interconnect router and/or switch data communications devices to form complex computer networks. An administrator of such a computer network (e.g., a corporate local area network) can use network management software to query components (e.g., client and server computer systems, switches, routers or other data communications devices) within the computer network to obtain their configuration state. The network management software is capable of interpreting the configuration state of equipment operating within the network in order to display a graphical interpretation of the topology of the computer network.

SUMMARY OF THE INVENTION

Conventional techniques and mechanisms for administering network environments such as those discussed above suffer from a variety of deficiencies. In particular, conventional network and computer system administration systems are unable to provide the ability to query an existing network configuration to determine an existing network topology and are not able to then compare the existing network topology with a desired or preferred networked configuration defining a preferred networked topology to determine if the existing network configuration can support or operate the desired or preferred networked configuration. Conventional network and/or computer system administration tools such as computer management software applications support management and control of existing network configurations but do not provide the capability to receive, from a network administrator for example, a preferred or desired network configuration which can be compared with the existing network configuration to determine if the existing network configuration is configured in a manner that will support the operation of the preferred network configuration. Administrators are thus left to using manual trial and error processes of discovering if an existing network configuration is configured in such a manner that a preferred network configuration exists therein.

As a specific example, consider a conventional multi-processor computer system such as the Wildcat Enterprise Server discussed above. This multi-processor computer system may be configured with many different domains or groups of interconnected compute and switch nodes. Some domains may include compute nodes interconnected with parallel data links that provide striping for redundancy purposes. Perhaps other domains of interconnected compute nodes contain compute nodes interconnected in buddy relationships. Still other domains may include directly connected compute nodes in which communications interfaces of compute nodes are connected with data links that do not pass through intermediate switch nodes. In a single multi-processor enterprise server computer system, there may be many hundreds of interconnected compute and switch nodes that collectively form an extremely complex array of interconnected components. Conventional software systems for administering such multi-processor computer systems can provide graphical displays that illustrate the various interconnection relationships between compute nodes in switch nodes. However, on a two-dimensional display such as a computer monitor, when a compute node is interconnected with multiple compute nodes and switch nodes are interconnected in complex arrangements of data links (i.e., a dense network fabric), it is often difficult for the administration software to effectively produce a graphical display which easily conveys the interconnection relationships between compute and switch nodes in a manner that is simple for an administrator to visually comprehend. In other words, since the interconnection relationships between compute and switch nodes can quickly become complex, it is difficult for both the administration software application and for the administrator to quickly determine current or existing domain or network configurations within the multi-processor enterprise server computer system.

In an effort to obtain a better understanding of the interconnection relationships between compute and switch nodes, an administrator may physically examine the interconnections of compute and switch nodes provided by data link cables extending between the compute and switch nodes within the rack mount enclosure that forms the multi-processor computer system. However, since hundreds of compute nodes are interconnected using one or more data link networking cables per compute node, the maze of existing cable interconnections can easily obscure any understanding of interconnection relationships that the administrator is attempting to obtain.

In addition, the administrator might require the ability to configure a preferred or desired network configuration within an enterprise server. As an example, the administrator might desire to configure a domain for a certain application that contains twelve compute nodes and two switch nodes. Conventional enterprise server management applications do not provide the ability to receive such a desired, optimal or preferred network configuration from the administrator and then examine the existing configuration of interconnections between compute nodes and switch nodes in the operational network to determine if there is already in existing network configuration within the enterprise server that supports the desired or preferred network configuration. In other words, conventional enterprise server management applications do not provide the ability to compare a preferred network configuration to the current or existing network configuration to determine if the existing network configuration contains a set of compute nodes and/or switch nodes that are currently configured in a manner that supports (or that is even close) the operation of the preferred network configuration. Because of these deficiencies, an administrator using conventional enterprise server management software is forced to manually ascertain the current interconnection relationships between compute nodes and switch nodes by physically examining the arrangement of cables that provide such connections in order to determine if the current set of compute nodes and switch nodes are interconnected in a manner that is close to or, hopefully, the same as the desired or preferred network configuration that the administrator is seeking to establish or configure.

Embodiments of the invention significantly overcome such difficulties and provide mechanisms and techniques for identifying one or more useable network configurations within an existing network configuration. As an example, a computer system or network administrator utilizing an embodiment of the invention can provide input specifying that he or she requires a preferred or desired network configuration comprising a certain number of switch nodes and compute nodes interconnected in a particular manner. Embodiments of the invention are able to receive this input and analyze an existing network configuration that includes any interconnection of compute nodes and switch nodes to determine if the existing interconnection contains or can support operation of a network that is close to, or the same as, or that is compatible with, the preferred network configuration specified by the administrator. If the existing network configuration contains an interconnection of compute nodes and switch nodes that corresponds to the layout or topology of the preferred network configuration, embodiments of the invention are able to identify which compute nodes and switch nodes are connected in this manner (i.e., the same as the preferred network configuration specified by the administrator).

In addition, if multiple configurations within the existing network configuration can support operation of the preferred network configuration, each matching configuration within the existing network configuration can be identified. Further still, in situations where the existing network configuration does not completely support the configuration that matches the preferred network configuration, embodiments of the invention are able to indicate which components such as compute nodes or switch nodes and which data links or interconnections somewhat match a portion of the preferred configuration. Further still, embodiments of the invention are able to identify nodes or interconnections that are missing or are required to be in place within the existing network configuration in order to produce a configuration that will support operation of the preferred network configuration. In other words, if there are no interconnections of compute nodes and switch nodes within the existing network configuration that precisely match the preferred network configuration, embodiments of the invention are able to indicate modifications that can be made to the existing network configuration in order to achieve a configuration that will support or match the preferred network configuration. In this manner, embodiments of the invention avoid the administrator from having to manually review an existing configuration in order to make an attempt at determining if the existing configuration can support a desired or preferred network topology required by the administrator.

In particular, embodiments of the invention provide a network analyzer that allows an administrator of a multi-processor computer system or other networked computer system environment to provide, as input to the network analyzer, a desired or preferred network configuration that defines a preferred network topology of an interconnection of compute nodes, switch nodes or other components. The network analyzer receives the preferred network configuration defining a preferred network topology and is able to produce a preferred network graph of nodes (i.e., compute nodes, switch nodes or other components interconnected with each other) defining the preferred network topology. The network analyzer also analyzes an existing network configuration to produce an existing network topology. In one embodiment, the network analyzer is able to produce an existing network graph of nodes defining the existing network topology. Embodiments of the network analyzer then compare the preferred network topology (i.e., graph) to the existing network topology to identify a useable network configuration within the existing network configuration that most closely supports operation of the preferred network configuration. In one embodiment of the invention, this involves the network analyzer applying a graph matching technique to compare the preferred network graph to the existing network graph to identify at least one useable network configuration corresponding to a set of existing interconnected nodes in the existing graph that most closely correspond to preferred nodes in the preferred network graph. The useable network configuration(s) indicate which existing nodes can support operation of the preferred network configuration within the existing network configuration. In this manner, embodiments of the invention are able to identify those configurations within the existing network configuration that match compute and switch node connectivity and adjacency requirements defined within the preferred network configuration.

In one embodiment of the invention, the network analyzer performs a procedure of iteratively mapping node combinations from the preferred network graph and the existing network graph based on corresponding node mapping characteristics to produce a solution set of usable nodes. This process is done in a recursive manner in order to compare all combinations of compute and switch node interconnection patterns defined within the existing network configuration in comparison with nodes defined within the preferred network configuration. Each different combination of attempts at matching the preferred network topology to the existing network topology (i.e., each graph matching attempt performed as a result of the recursive iterative matching) results in the production of a distinct solution set of useable nodes. A solution set of useable nodes contains those nodes in the existing network configuration that match at least a portion of the interconnected nodes of the preferred network configuration. In some cases, the solution set of usable nodes may identify nodes of the existing network configuration that are interconnected in a manner that precisely matches the interconnections of nodes of the preferred network configuration. In other cases, the solution set identifies nodes that match only some of the preferred network topology nodes.

The network analyzer is able to compare a configuration characteristic (such as the total number of nodes matched) of the solution set of useable nodes to a best match configuration characteristic derived from the preferred network graph to determine if the solution set of useable nodes (i.e., produced from one recursive iteration of graph matching) is a best match solution set of useable nodes. If so, the network analyzer saves this solution set as the best match solution set of useable nodes, or in other words, saves the current solution set as a useable network configuration. Accordingly, using the iterative graph matching techniques explained herein, embodiments of the invention are able to identify the various combinations of configurations within the existing network configuration that match all or a portion of the preferred network configuration. Those that match the closest or exactly are identified as useable network configurations.

In another embodiment of the invention, once the network analyzer produces one or more usable network configurations, the network analyzer can compare the useable network configuration(s) to the preferred network configuration (i.e., to the desired or optimal network configuration specified as input by the administrator) to identify a set of missing nodes and node interconnections within the preferred network configuration that do not exist within the useable network configuration(s). The set of missing nodes and node interconnections indicate modifications required to be made to the existing network configuration in order to support operation of the preferred network configuration. Accordingly, such embodiments of the invention provide a best match technology that can identify a set of nodes and interconnections within an existing network configuration that most closely match the preferred or desired network configuration and, in situations where the exact match is not found within the existing network configuration, embodiments of the invention are able to indicate or suggest modifications that are required to be made to the existing network configuration to produce a configuration that matches the preferred network topology.

The operation of embodiments of the invention thus greatly simplifies an administrator's task of determining if an existing interconnection of switch and compute nodes contains a specific desired configuration and further simplifies the task of identifying which pieces or components (i.e., interconnections of switch and/or compute nodes or other components) of an existing network configuration must be modified in order to arrive at a configuration that is the same as a preferred network configuration desired by the administrator.

Other embodiments of the invention include a computerized device, workstation, handheld or laptop computer, or the like configured with software and/or circuitry (e.g., a processor as summarized above) to process any or all of the method operations disclosed herein as embodiments of the invention. In other words, a computerized device or a processor that is programmed or configured to operate as explained herein is considered an embodiment of the invention.

Other embodiments of the invention that are disclosed herein include software programs to perform the method embodiment steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein as embodiments of the invention. Such arrangements of the invention are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments of the invention.

It is to be understood that the system of the invention can be embodied strictly as a software program, as software and hardware, or as hardware alone such as a processor. Example embodiments of the invention may be implemented within computer systems, processors, and computer program products and/or software applications manufactured by Sun Microsystems Inc. of Palo Alto, Calif., USA.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION OF EMBODIMENTS

Figure 1:
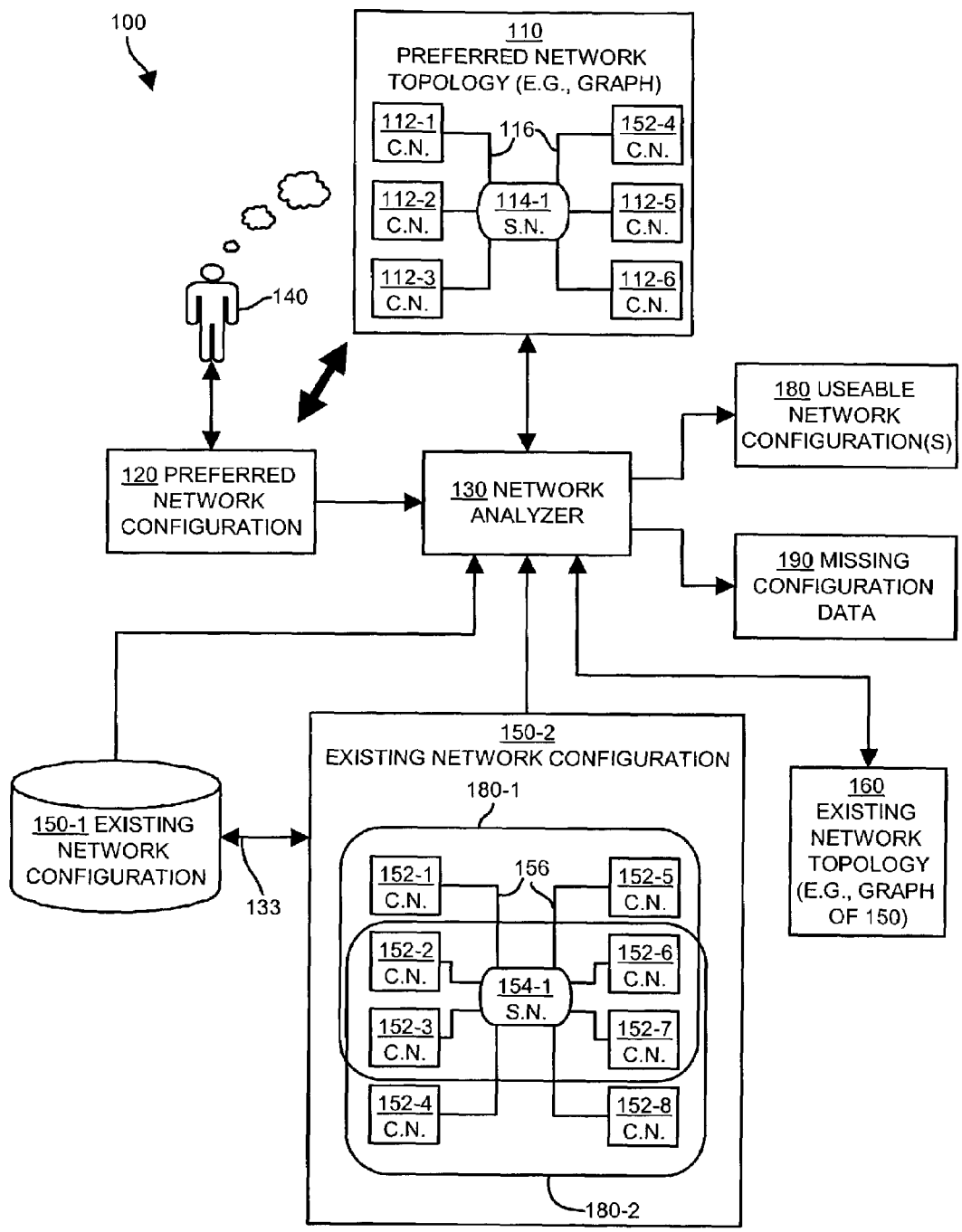
FIG. 1 illustrates a computer system environment suitable for use in explaining the operation of a network analyzer configured according to embodiments of the invention.

Generally, embodiments of the invention provide a network analyzer computer system and/or software application that operates mechanisms and techniques for identifying one or more useable network configurations within an existing network configuration. As an example, a computer system or network administrator utilizing a network analyzer configured according to one embodiment of the invention can provide input specifying that he or she requires a preferred or desired network configuration comprising a certain number of switch nodes and compute nodes interconnected in a particular manner. The network analyzer is able to receive this input and produce, based on an analysis of this input, a preferred network topology such as a preferred network graph containing a list of vertices (i.e., nodes) and edges (i.e., interconnections between nodes) that formally describes this preferred network configuration. In addition, the network analyzer can analyze an existing network configuration (i.e., an actual operating network) that includes an interconnection of compute nodes and switch nodes and can produce an existing network topology (i.e., an existing network graph) that formally describes the existing interconnection relationships between the compute nodes, switch nodes and/or other components in the existing network configuration. The network analyzer then compares the preferred network topology to the existing network topology in order to determine if the existing configuration (i.e., the existing network) contains or can support operation of a network that is the same as, that matches, or that is compatible with the preferred network configuration specified by the administrator. If the existing network configuration contains an interconnection of compute nodes and switch nodes that exactly corresponds to the layout or topology of the preferred network configuration, embodiments of the invention are able to identify which existing interconnected compute nodes and switch nodes are connected in this manner (i.e., which nodes for a network that is the same as the preferred network configuration specified by the administrator).

In addition, if multiple interconnected node configurations within the existing network configuration can support operation of the preferred network configuration, the network analyzer identifies each matching configuration within the existing network configuration. In situations where the existing network configuration does not completely support a full configuration that exactly matches the preferred network configuration (e.g., may be only a portion of the existing interconnected compute and switch nodes match only some portion of the preferred network configuration), the network analyzer is able to indicate those interconnected existing components such as compute nodes or switch nodes that most closely represent the preferred or desired network configuration. The network analyzer can also identify which existing data links, interconnections and/or nodes are missing or are (i.e., would be) required to be in place within the existing network configuration in order to produce a configuration that will support operation of (i.e., provide) the preferred network configuration. In other words, if there are no interconnections of compute nodes and switch nodes within the existing network configuration that precisely match the preferred network configuration, embodiments of the invention are able to indicate those interconnected nodes that most closely match the preferred network configuration and can also identify modifications that can or should be made, by the administrator, to the existing network configuration in order to reconfigure some or all of the existing network configuration in order to achieve a configuration that will support or match the preferred network configuration.

In this manner, embodiments of the invention avoid the administrator from having to manually review an existing network configuration in order to make an attempt at determining if the existing configuration can support a desired network topology required by the administrator.

FIG. 1 illustrates an example computer system environment 100 that is suitable for use in explaining example operations of a network analyzer 130 configured according to embodiments of the invention. As illustrated in FIG. 1, a human user referred to herein as an administrator 140 can create 122 a preferred network configuration 120. The preferred network configuration 120 can identify or contain a list of a desired set of interconnected network components such as compute nodes and switch nodes. In the illustrated example, the preferred network configuration 120 matches the preferred network topology 110 that is conceptualized or desired by the administrator 140. In other words, in this example, the administrator 140 produces the preferred network configuration 120 that, if converted into an actual operating network, would appear as the preferred network topology or graph 110. In this example, the preferred network topology 110 contains a plurality of compute nodes 112-1 through 112-6 interconnected via data links or interconnections 116 with a single switch node 114-1. This preferred network topology 110 is expressed as data structures, database records, or other information that defines the nodes and interconnections within the preferred network configuration 120.

In addition to the preferred network configuration 120 that the administrator 140 provides (in this example), the computer system environment 100 includes an actual operating or existing network configuration 150, represented collectively by existing network configuration data 150-1 and the existing network configuration components 150-2. That is, the existing network configuration components 150-2 comprise, in this example, a real operating interconnection of the actual compute nodes 152-1 through 152-8 interconnected by data links or interconnections 156 to a single switch node 154-1 (collectively referred to herein as existing nodes). The existing network configuration data 150-1 represents node configuration information, run-time data, operational parameters or other information related to the run-time state of the compute nodes 152 and the switch node 154 operating within the existing network configuration 150-2. In this example, the existing network configuration 150 (the data 150-1 and components 150-2) may be, for example, a multi-processor enterprise server computer system such as a Wildcat Enterprise Server manufactured by Sun Microsystems, Inc. of Mountain View, Calif. To it is to be understood that the existing network configuration 150 is not limited to compute nodes and switch nodes operating within a multi-processor computer system. In alternative embodiments of the invention, the existing network configuration 150 can be any interconnection of host computer systems, computerized devices, switches, routers, or other data communications devices within a computer network such as a corporate local area network or wide area network such as the Internet.

Further details of the operation of the network analyzer 130 and other components of the computer system environment 100 illustrated in FIG. 1 will now be explained with respect to the processing steps performed by the network analyzer 130 as shown in the flow chart in FIG. 2.

Figure 2:
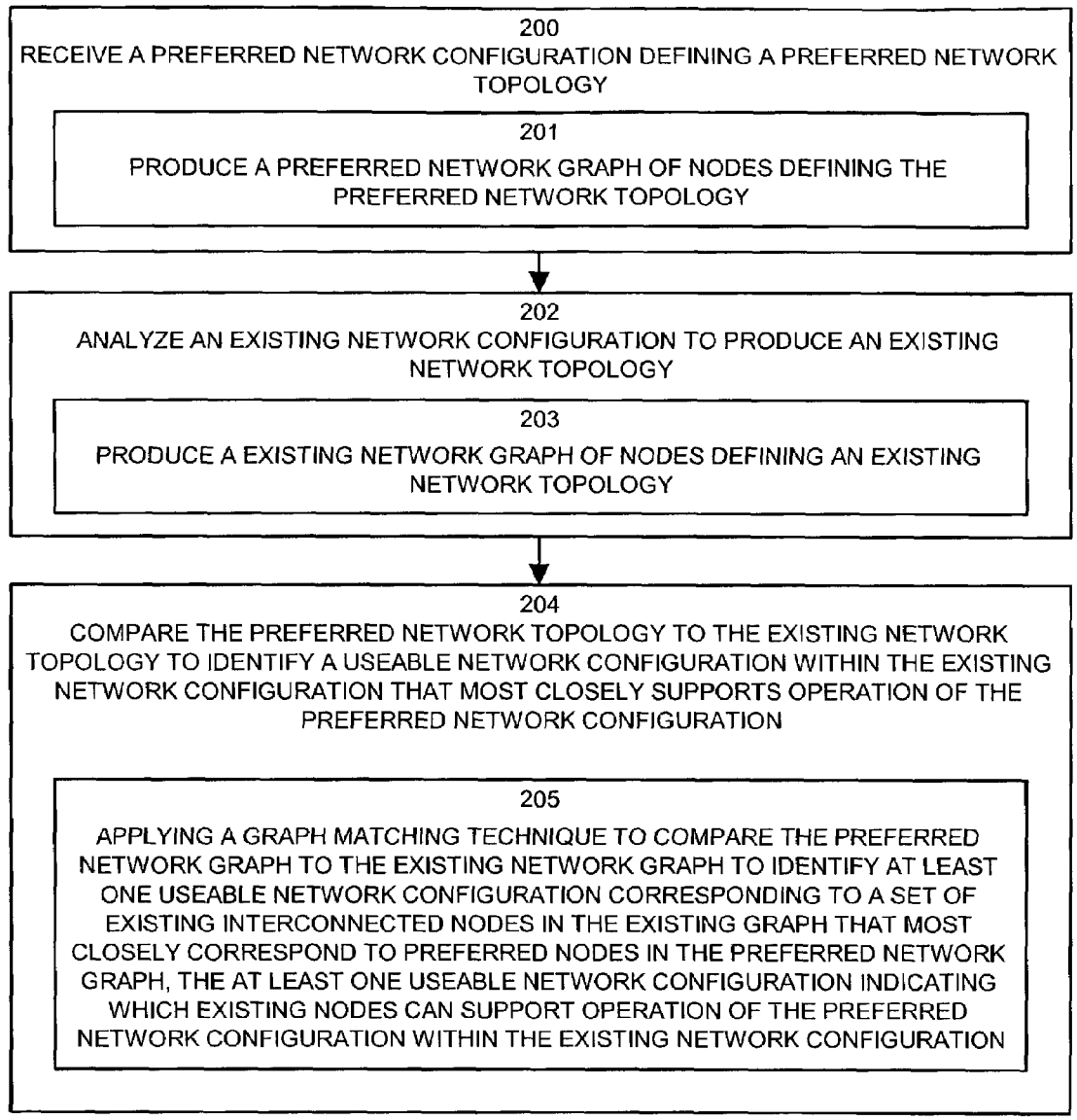
FIG. 2 is a flow chart of processing steps performed by a network analyzer configured according to one embodiment of the invention.

FIG. 2 is a flow chart of processing steps performed by the network analyzer 130 in accordance with one example embodiment of the invention.

In step 200, the network analyzer 130 receives a preferred network configuration 120 that defines a preferred network topology 110. By "defines" in this example, what is meant is that the preferred network configuration 120 contains data structures or other information that identifies a set of compute nodes 112, a set of switch nodes 114, and any interconnections (e.g., 116) between the switch nodes and compute nodes.

In this example to perform the processing of step 200, the network analyzer 130 performs step 201 to produce a preferred network graph of nodes defining the preferred network topology 110. The terms graph and topology are used interchangeably in this example. In other words, upon receiving the preferred network configuration 120 containing data definitions for an interconnected set of compute nodes and switch nodes, the network analyzer 130 performs processing (to be explained in detail later) to produce the preferred network topology graph 110.

Next, in step 202, the network analyzer 130 analyzes the existing network configuration 150 to produce an existing network topology 160. Details of this processing will be explained shortly but in general, the processing of step 202 involves the network analyzer 130 determining which components operate within the existing network configuration 150 (i.e., detecting the presence of compute nodes 152 and switch nodes 154) and querying the nodes or the existing configuration data 150-1 to determine the interconnection of these nodes 152 and 154.

As part of the processing of step 202, the network analyzer 130 performs step 203 to produce an existing network graph of nodes defining the existing network topology 160. That is, in a manner similar to that of step 201, the network analyzer 130 identifies a set of operating or existing switch and compute nodes 152, 154 to detect interconnection relationships 156 between these nodes and develops an existing network graph 160 that formally defines the nodes and their interconnection relationships. By formally producing preferred and existing network graphs 110 and 160 in steps 201 and 203 for both the preferred network configuration 120 (i.e., desired by the administrator 140) and the existing network configuration 150 (i.e., defining what actually exists in operation), the network analyzer 130, as will be explained, can use a graph matching technique to compare the preferred network graph 110 to the existing network graph 160 to detect portions of the existing network graph 160 that match the preferred network graph 110 and to identify those portions of the existing network graph 160 that are required (i.e., that are missing) to provide a graph (and hence a network configuration) that matches the desired or preferred network configuration. This processing is explained that with respect to steps 204 and 205.

In step 204, the network analyzer 130 compares the preferred network topology 110 to the existing network topology 160 to identify one or more useable network configurations 180 (180-1 and 180-2 specifically shown in this example) within the existing network configuration 150 that most closely support operation of the preferred network configuration 120. This processing allows the network analyzer 130 to indicate to the administrator 140 which interconnections of compute nodes 152 and switch nodes 154 within the existing network configuration 150 match or correspond with interconnections of compute nodes 112 and switch nodes 114 within the preferred network topology 110 defined by the preferred network configuration 120. To compare the two network topologies 110 and 160 according to one embodiment of the invention, the network analyzer performs the processing step 205.

In step 205, the network analyzer 130 applies a graph matching technique to compare the preferred network graph 110 to the existing network graph 160 to identify at least one useable network configuration 180 corresponding to a set of existing interconnected nodes 152 and 154 in the existing network graph 160 that most closely correspond to preferred nodes 112 and 114 in the preferred network graph 110. The useable network configurations 180 indicate which interconnections of existing nodes 152 and 154 can support operation of the preferred network configuration 120 within the existing network configuration 150. In this manner, the administrator 140 can operate the network analyzer 130 to identify node interconnections within the existing network configuration 150 that match the interconnection relationships between nodes within the preferred network configuration 120 that defines the preferred network topology 110 that the administrator 140 desires to optimally implement.

As illustrated in the example in FIG. 1, the existing network configuration 150-2 includes eight compute nodes 152-1 through 152-8 interconnected as shown to a single switch node 154-1, whereas the preferred network configuration 120 defines the preferred network topology 110 that contains six compute nodes 112-1 through 112-6 interconnected by a single switch node 114-1. Using the processing explained above with respect to the steps 200 through 205, the network analyzer 130 matches the preferred network topology 110 onto the existing network topology 160 (that defines node relationships that correlate to the illustrated existing network configuration 150-2) in order to identify useable network configurations 180-1 and 180-2 within the existing network configuration 150 that match or that support the operation of the preferred network configuration 120 desired by the administrator 140. The network analyzer 130 in this example thus presents two alternative choices of useable network configurations 180 (i.e., 180-1 or 180-2) from which the administrator 140 can choose from in order to operate the preferred network configuration 120 within the existing network configuration 150-2. That is, in this example, there are two sets 180-1 and 180-2 of six compute nodes 152 coupled by the single switch node 154-1 that exactly match the configuration of the preferred network topology 110. Note that in this example, only two useable network configurations 180 are illustrated for simplicity of this explanation. It is to be understood that that may be other useable network configurations that may exist within the existing network configuration 150 that also support operation of the preferred network configuration 120 defining six compute nodes 112 interconnected with a single switch node 114.

Figure 3:
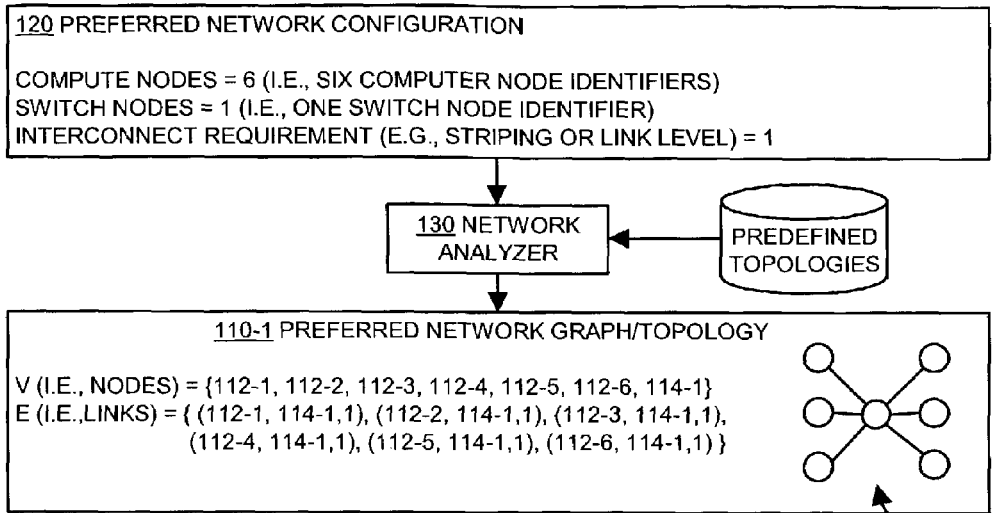
FIG. 3 illustrates a network analyzer performing an analysis of a preferred network configuration to produce a preferred network topology or graph according to one embodiment of the invention.

FIG. 3 illustrates an example of the network analyzer 130 receiving the preferred network configuration 120 defining a number of compute nodes, switch nodes and interconnection requirements between the compute and switch nodes and shows how the preferred network graph 110-1 (represented by vertice and edge data structures) might appear. In particular, the preferred network configuration 120 in this example indicates that the administrator 140 desires a preferred network that includes six (6) compute nodes and one (1) switch node and has an interconnect requirement of one (1). The interconnect requirement may be, for example, a striping or link level that defines how many parallel or concurrent connections exist between compute nodes and switch nodes. The network analyzer 130 receives this information and produces the preferred network graph 110-1 (i.e., by processing steps 200 and 201 in FIG. 2) that identifies each of the six compute nodes and one switch node as a set of vertices 112-1 through 112-6 and 114-1. The edges of the graph 110 are defined in standard mathematical graph notation as a pair of vertices and a value for the interconnect requirement. In other words, a single edge is represented in parentheses as (vertice 1, vertice 2, interconnect requirement), where each vertice represents a node (either a switch node or compute node in this example) and the interconnect requirement represents a striping or link level between those nodes. As a specific example, the edge (112-3, 114-1, 1) indicates that node 112-3 (a compute node) is interconnected with a single data link (the "1" as the third portion of the tuple) to node 114-1 (a switch node). The visual graph 110-2 shown in FIG. 3 graphically depicts the topology of vertices and edges of the preferred network graph data 110-1 and is shown here for illustrative purposes.

It is to be understood that the network analyzer 130 can receive and represent the preferred network configuration 120 and the preferred network graph data 110-1 as any type of data structure in a memory system. As an example, in an object oriented programming environment, the administrator 140 may provide a data file or database that defines various compute nodes 112 and switch nodes 114 as well as the interconnections between such nodes. The network analyzer 130 can read such information to create objects in memory representative of compute nodes and switch nodes using pointers for the interconnection relationships between these nodes.

Figure 4:
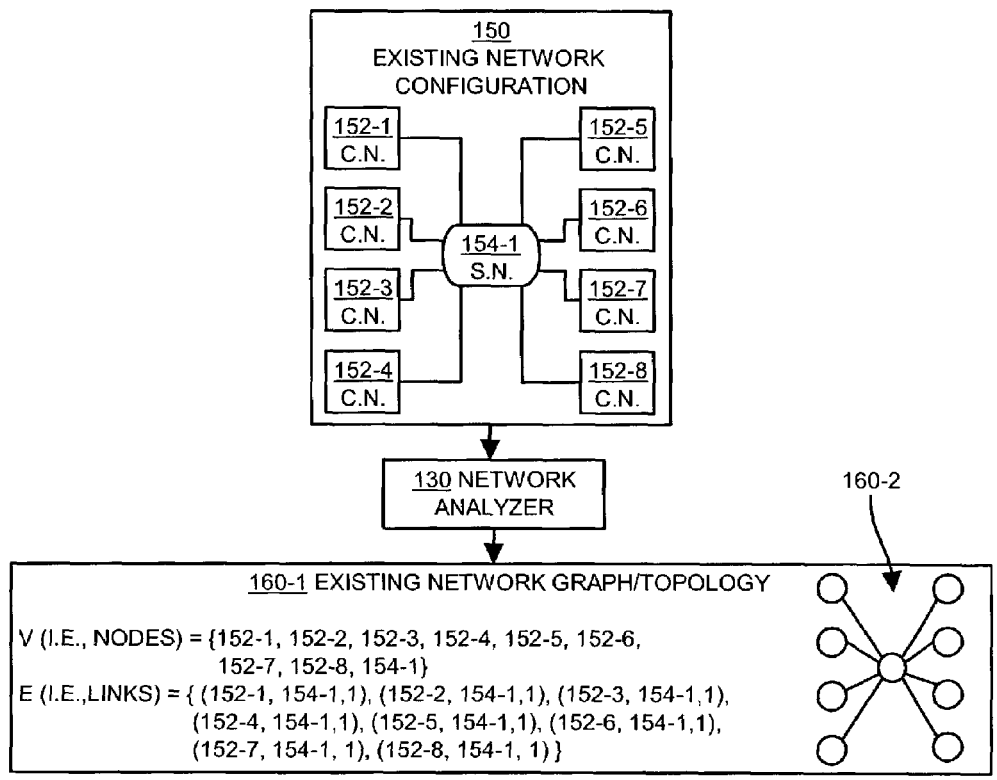
FIG. 4 illustrates a network analyzer performing an analysis of an existing network configuration to produce an existing network topology or graph according to one embodiment of the invention.

FIG. 4 illustrates how the network analyzer 130 can analyze an existing network configuration 150 containing a number of existing and operating compute nodes 152, switch nodes 154 (or other components) and interconnections 156 (i.e., links) between the compute and switch nodes to convert this existing network configuration 150 into an existing network graph 160-1 (represented by data structures) that is visually illustrated as the graph 160-2. As explained above with respect to FIG. 3, the existing network graph 160-1 contains data identifying of each node 152-1 through 152-8 and 154-1 as a vertice, and defines a series of data links (156 in FIG. 1) as interconnection edges between the nodes. By resolving or normalizing the preferred network configuration 120 into a preferred network graph 110-1 and the existing network configuration 150 into the existing network graph 160-1, the network analyzer can compare the two graphs 110-1 and 160-1 with each other as explained herein to identify which vertices and edges of the existing network graph 160-1 match the preferred network graph 110-1.

Figure 5:
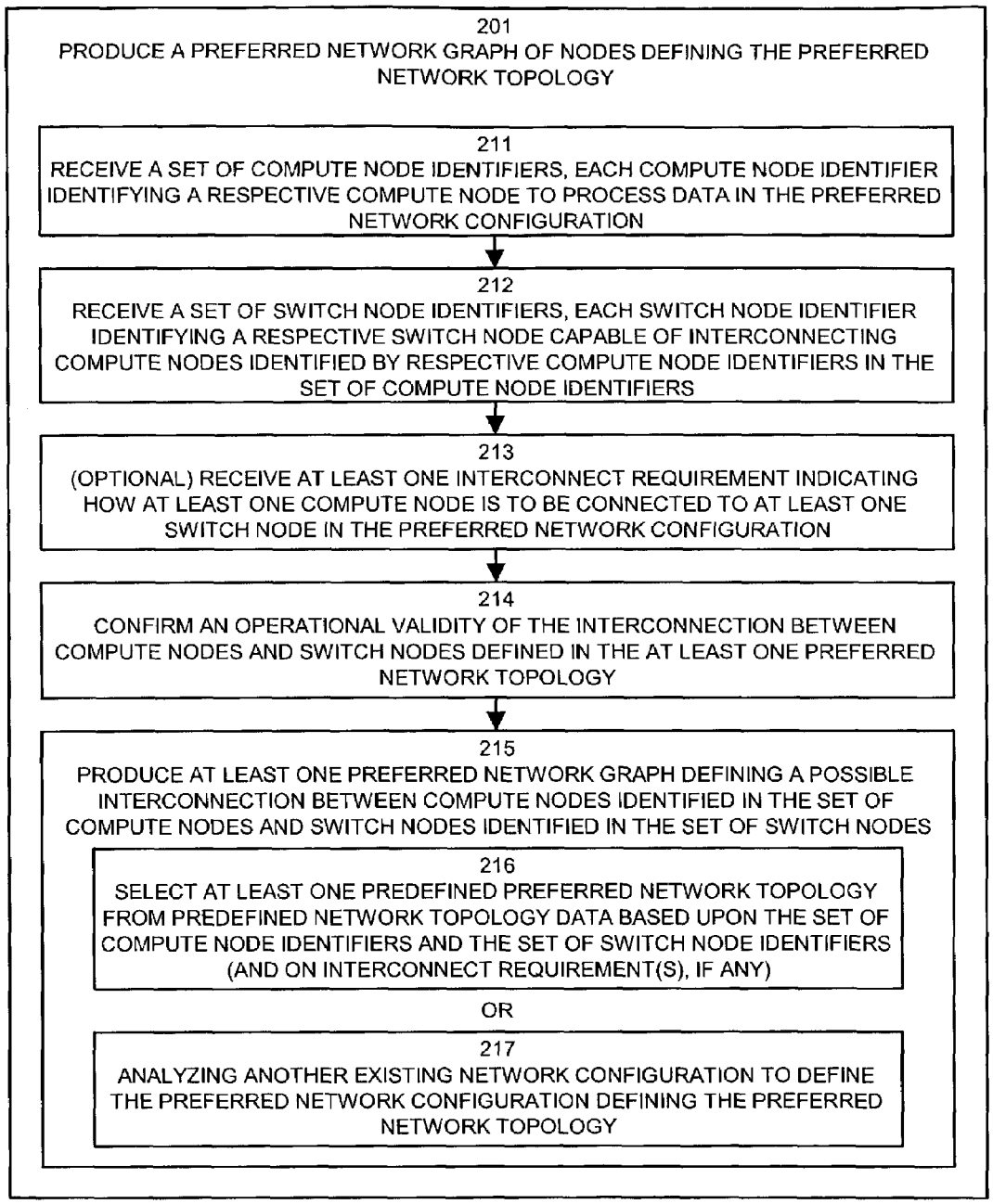
FIG. 5 is a flow chart of processing steps performed by a network analyzer to produce a preferred network graph of nodes based on a preferred network configuration according to one embodiment of the invention.

FIG. 5 illustrates a series of processing steps performed by a network analyzer 130 in accordance with one embodiment of the invention to produce a preferred network graph of nodes defining the preferred network topology 110-1 based upon a preferred network configuration 120. The processing steps shown in the flow chart in FIG. 5 result in the transformation of the preferred network configuration 120 to a preferred network graph 110 as illustrated in FIG. 3, previously discussed above.

In step 211, the network analyzer 130 receives a set of compute node identifiers. Each compute node identifier identifies a respective compute node 112 that is to process data in the preferred network configuration 120. With respect to the example previously discussed in FIG. 3, the compute node identifiers can comprise six specifications of compute nodes to be utilized within a preferred network configuration 120.

Next, in step 212, the network analyzer 130 receives a set of switch node identifiers. Each switch node identifier identifies a respective switch node 114 capable of interconnecting compute nodes 112 identified by respective compute node identifiers in the set of compute node identifiers received in step 211.

Next, in step 213, which is an optional step, the network analyzer 130 receives at least one interconnect requirement indicating how at least one compute node 112 is to be connected to at least one switch node 114 in the preferred network configuration 120. As indicated above with respect to the discussion of FIG. 3, the interconnect requirement in this example defines a number of current interconnections between nodes within the preferred network configuration 120. If no interconnect requirement as specified, a default value of one interconnect or data link exists between nodes in the preferred network configuration 120.

Next, in step 214, which is also an optional step, the network analyzer 130 confirms an operational validity of the interconnection between compute nodes and switch nodes defined in the preferred network configuration 120. That is, in step 214 the network analyzer 130 determines if the set of compute nodes, switch nodes and interconnection requirements specified within the preferred network configuration 120 is acceptable from an operational standpoint. As a specific example, if the administrator 140 specifies a preferred network configuration 120 indicating ten compute nodes 112 to be interconnected with a single switch node 114, and the network analyzer 130 is configured to be "aware" that no switch node 114 allows more than eight interface ports, then in step 214, the operational validity of coupling ten compute nodes 112 to a switch node 114 that has a maximum of eight interface ports would be a nonconforming or illegal network topology and the network analyzer 130 can, at this point, prompt the network administrator 140 to refine or amend the preferred network configuration 120 by identifying that there are two extra compute nodes that cannot be connected to the single eight port switch node specified. Note that the network analyzer can obtain the proper allowed configurations from the network topology data 138 shown in FIG. 3. The network topology data can define rules or other indications of what valid connections are allowed between network components.

After confirming the operational validity of the preferred network configuration 120, the network analyzer 130 performs the processing step 215 (including steps 216 or, alternatively, step 217) to produce at least one preferred network graph 110 defining a possible interconnection between compute nodes 112 identified in the set of compute nodes (received in step 211) and switch nodes 114 identified in the set of switch nodes (received in step 212). In other words, in step 215, once the network analyzer 130 has received the desired or preferred network configuration parameters 120 defining the compute nodes and switch nodes and interconnections 116, the network analyzer 130 produces a graph such as the preferred network graph 110-1 in step 215. According to embodiments of the invention, this can be done in a variety of ways as shown in step 216 or alternatively in step 217.

In step 216, the network analyzer 130 can produce at least one preferred network graph by selecting at least one predefined preferred network topology from predefined network topology data 138 based upon the set of compute node identifiers and the set of switch node identifiers (and on any interconnect requirement, if any) specified as input and steps 211 through 213. In other words, in step 216, based upon the parameters defining the preferred network configuration 120, the network analyzer 130 can access a database 138 of predefined network topology data in order to select a predefined network topology for the desired number of compute nodes and switch nodes specified by the administrator 140. Such predefined network topologies can be configured by network designers to represent an optimal configuration based upon the number of compute nodes and switch nodes desired for a particular network operation or application.

In an alternative embodiment of the invention, in step 217, the network analyzer 130 produces at least one preferred network graph or topology 110 by analyzing another existing network configuration to define the preferred network configuration thus defining the preferred network topology 110. Note that the illustration in FIG. 1 shows an embodiment in which the administrator 140 provides the preferred network configuration 120 from which the network analyzer 130 receives the switch and compute node identifiers and interconnections (in steps 211, 212 and 213). In an alternative embodiment of the invention, the network analyzer 130 can obtain the preferred network configuration 120 via an analysis of another existing operational network (not specifically shown in the example of FIG. 1). That is, while the preferred network configuration 120 is provided as a data file or other type of input from the administrator 140 in FIG. 1, the network analyzer 130 is also capable of performing the procedure similar to that as explained above with respect to steps 202 and 203 in FIG. 2 of analyzing an existing network configuration (one other than 150). The purpose of performing this analysis of another existing network configuration would be to identify the network topology of this other existing network and to determine if the existing network configuration 150 contains a similar set of interconnected nodes. In other words, steps 211 and 212 can cause the network analyzer 130 to analyze the first network to develop a graph of that network as the preferred network topology 110 and can compare this graph as will be explained herein to a graph of another existing network 150. In this embodiment then, the network analyzer 130 in steps 211 through numeral 213 can obtain compute node identifiers and switch node identifiers and interconnection relationships between these nodes via a real-time analysis of another existing network in order to determine if this existing network is represented by a series of interconnected nodes within the existing network configuration 150. In this manner, the network analyzer 130 can process step 217 to avoid the requirement of the network administrator 140 to manually specify a preferred network configuration 120, and the process of developing the preferred network graph in step 217 is based upon analysis of the other existing network.

Figure 6:
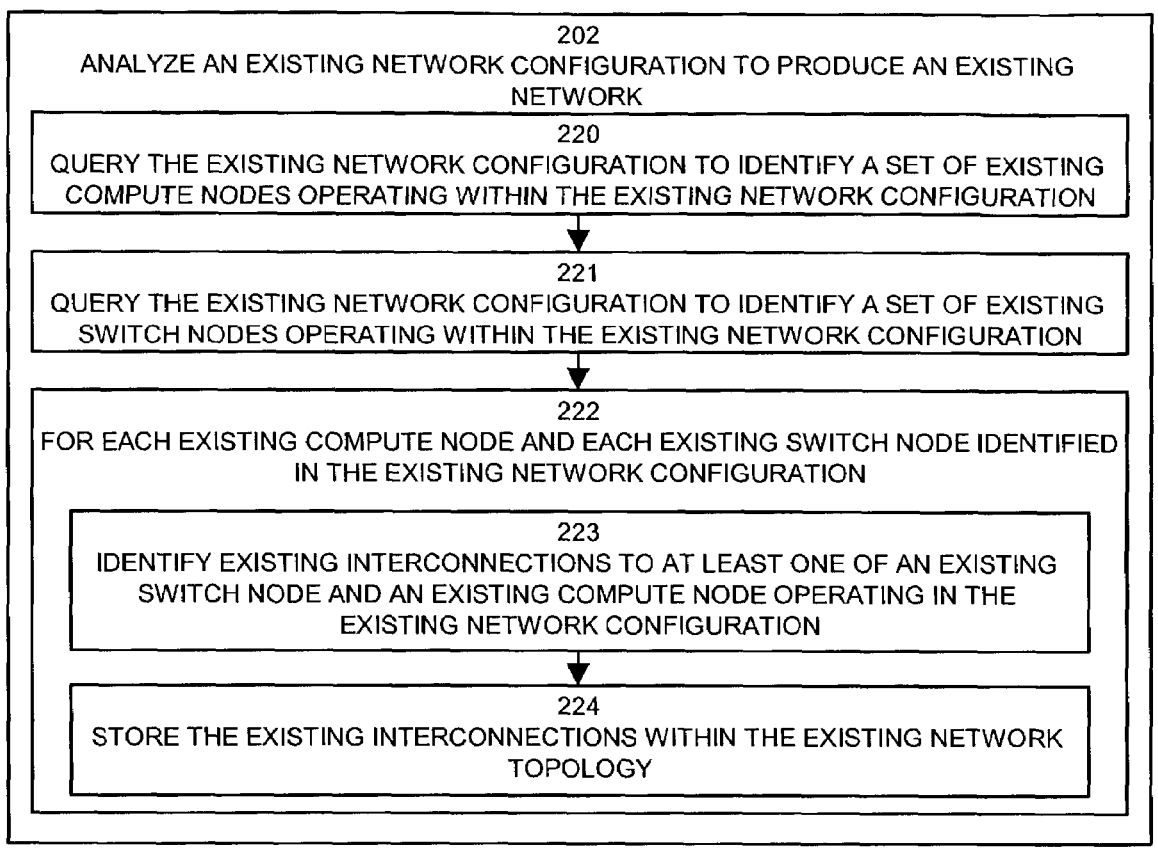
FIG. 6 is a flow chart of processing steps performed by a network analyzer to analyze an existing network configuration to produce an existing network topology or graph according to one embodiment of the invention.

FIG. 6 is a flow chart of processing steps that the network analyzer 130 performs according to one embodiment of the invention to analyze an existing network configuration to produce an existing network topology 160. The processing steps 220 through 224 in FIG. 6 represent details of processing step 202 from a flow chart in FIG. 2 and illustrated how the network analyzer 130 can analyze the existing network configuration 150 in FIG. 4 to produce the preferred network topology 160.

In step 220 the network analyzer 130 queries the existing network configuration 150 to identify a set of existing compute nodes 152 operating within the existing network configuration 150 (i.e., queries compute nodes 152-1 through 152-8 in 150-2 in FIG. 1). A protocol such as the Simple Network Management Protocol (SNMP) can be used for this purpose.

In step 221, the network analyzer 130 queries the existing network configuration 150 to identify a set of existing switch nodes 154 operating within the existing network configuration 150 (i.e., queries switch node 154-1 in 150-2 in FIG. 1).

In step 222, the network analyzer 130 enters a processing loop that is performed for each existing compute node 152-1 through 152-8 and each existing switch node 154-1 identified in the existing network configuration 150 (i.e., identified by the querying process of steps 220 and 221).

In step 223, within the processing loop in step 222, for a particular existing compute or switch node 152 or 154, the network analyzer 130 identifies existing interconnections to at least one other existing switch node 152 or compute node 154 operating in existing network configuration 150. In other words, in step 223, the network analyzer 130 identifies, for the current compute or switch node being processed in this iteration of the loop defined by step 222, any interconnections to other switch or compute nodes or other devices operating within the existing network configuration 150.

In step 224, the network analyzer 130 stores the existing interconnections detected in step 223 within the existing network topology 160 (i.e., as graph edges). In this manner, the iterative processing of steps 223 and 224 within the loop defined by step 222 causes the network analyzer 130 to discover the connectivity and adjacently relationships between the compute nodes and switch nodes presently operating in existing network configuration 150. Once the network analyzer 130 discovers the existing network topology 160 in this manner, the network analyzer 130 can compare various node interconnections of the existing network topology 160 as expressed in the existing network topology graph 160-1 with various node interconnection relationships expressed in the preferred network topology graph 110-1.

Figure 7:
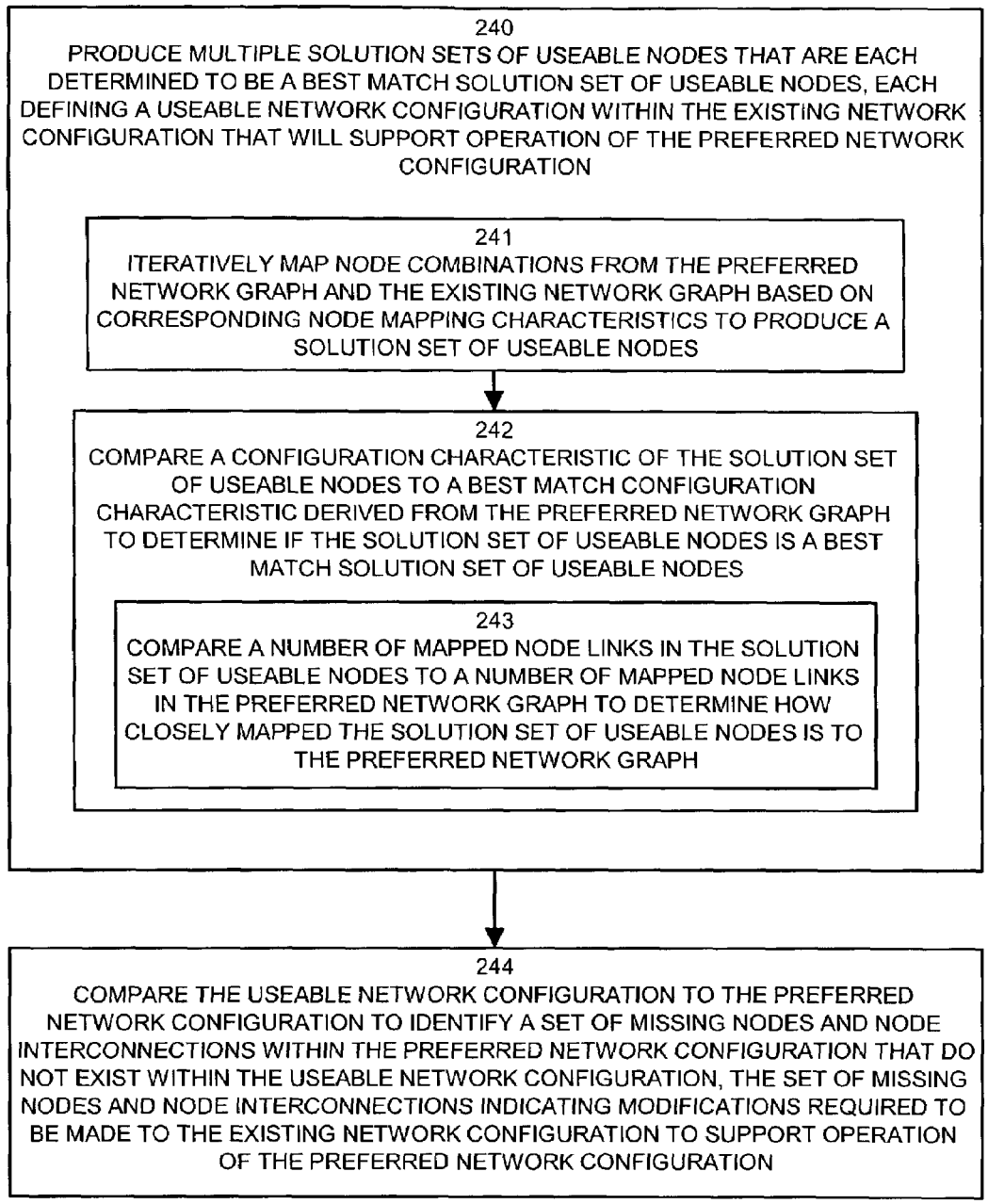
FIG. 7 is a flow chart of processing steps performed by a network analyzer to produce a useable network configuration from a comparison of the preferred and existing network topology graphs according to one example embodiment of the invention.

FIG. 7 is a flow chart of processing steps performed by the network analyzer 130 to generally carry out the processing of step 204 in FIG. 2 to compare the preferred network topology graph 110 to the existing network topology graph 160 to identify one or more useable network configurations 180 within the existing network configuration 150 that most closely support operation of the preferred network configuration to 120.

In step 240, the network analyzer produces multiple solution sets of useable nodes that are each determined to be a best match solution set of useable nodes (i.e., that each define a set of existing network configuration node interconnections that match at least a portion of node interconnections defined within the preferred network topology). That is, each solution set of usable nodes defines a useable network configuration 180 within the existing network configuration 150 that will support operation of at least a portion of (and hopefully all of) the preferred network configuration 120. Details of processing of step 240, in which the network analyzer 130 produces solution sets of useable nodes that define usable network configurations 180, are provided and steps 241 through 243 and in the flow charts in FIGS. 8 and 9 that will be explained shortly.

In step 241, the network analyzer 130 iteratively maps with node combinations from the preferred network graph 110 and the existing network graph 150 based on a corresponding node mapping characteristic (i.e., corresponding between the nodes) to produce a solution set of usable nodes. The details of processing according to one embodiment of step 241 will be explained shortly with respect to the flow chart of processing steps shown in FIG. 8.

Continuing with the discussion of processing steps shown in FIG. 7, in step 242, the network analyzer 130 compares a configuration characteristic of the solution set of usable nodes to a best match configuration characteristic derived from the preferred network graph 110 to determine if the solution set of useable nodes is a best match solution set of useable nodes. In one example embodiment of the invention, a configuration characteristic is defined by the number of nodes interconnected or linked with each other in the solution set of usable nodes determined by the iterative mapping processing in step 241. In other words, in step 241 and as will be explained in detail in the flow chart in FIG. 8, the network analyzer 130 performs an iterative process of mapping as many existing interconnections of compute and switch nodes 152 and 154 within the existing network configuration 150 to preferred nodes that have a corresponding configuration characteristic (e.g., the same type of node and/or the same set of interconnection relationships to other compute or switch nodes) within the preferred network topology 110. During this processing, if a particular solution set of useable nodes contains a large number of mappings between compute and switch nodes that is equal to or only slightly less than compute and switch node mappings within the preferred network topology 110, then that solution set of useable nodes identifies a set of nodes within the existing network configuration 150 that closely or possibly exactly match the configuration defined by the preferred network topology 110. In one embodiment of the invention, a configuration characteristic identifying, for example, the number of mapped nodes (i.e., combinations of compute nodes and/or switch nodes that correspond to compute and switch nodes having the same type and/or set of interconnections within the preferred network topology) provides an indication of how close the solution set of useable nodes is to the preferred network topology.

Accordingly, in step 243, which represents one embodiment of step 242, the network analyzer 130 compares the value of the number of mapped node links in a particular solution set of usable nodes to the total number of node mappings or mapped node links that express the interconnection relationships between compute and switch nodes within the preferred network topology or graph 110 in order to determine how closely mapped the solution set of useable nodes is to the preferred network graph 110. As will be explained shortly, with respect to the flow chart of processing steps shown in FIG. 9, those solution sets with a close number of mapped node links are saved as useable network configurations 180.

Upon completion of processing steps 240 through 243, the network analyzer 130 produces one or more solution sets of useable nodes that define useable network configurations 180 (e.g., 180-1, 180-2 in FIG. 1). In this manner, embodiments of the invention that perform as explained above allow the administrator 140 to consult a set of one or more best match solution sets of useable nodes (i.e., useable network configurations 180) that identify compute and switch nodes interconnected within the existing network configuration 150 that most closely match compute and switch node interconnections defined within the preferred network topology 110.

In step 244, once the network analyzer 130 produces one or more usable network configurations 180, the network analyzer 130 compares the useable network configuration(s) 180 (i.e., the best matches of existing node configurations that most closely or exactly matched the preferred network configuration) to identify a set of missing nodes and/or node interconnections within the preferred network configuration 120 that do not exist within the useable network configuration(s) 180. This set of missing nodes and/or node interconnections indicates modifications that the administrator 140 can make to the existing network configuration 150 in order reconfigured this configuration 150 to support operation of the preferred network configuration 120. In other words, in step 244, embodiments of the network analyzer 130 are able to compare the usable network configurations 180 with the preferred network topology 110 to identify portions of the preferred network topology 110 that are not supported or provided for within the useable network configurations 180. Those portions of the preferred network topology 110 that are not defined within the usable network configuration 180 are indicated as defining the set of changes or missing nodes and node interconnections (i.e., missing configuration data 190 in FIG. 1) that must be made to the existing network configuration 150 in order for the existing network configuration 150 to be fully configured in an operational manner to support operation of the preferred network configuration 120 as specified by the administrator 140.

Accordingly, the processing of step 244 allows the network analyzer 130 to identify changes 190 that must be made to the existing network configuration 150 by the administrator 140 in order to bring the existing network configuration 150 into compliance with a network configuration that is equivalent to the preferred network topology 110 desired by the administrator 140.

Figure 8:
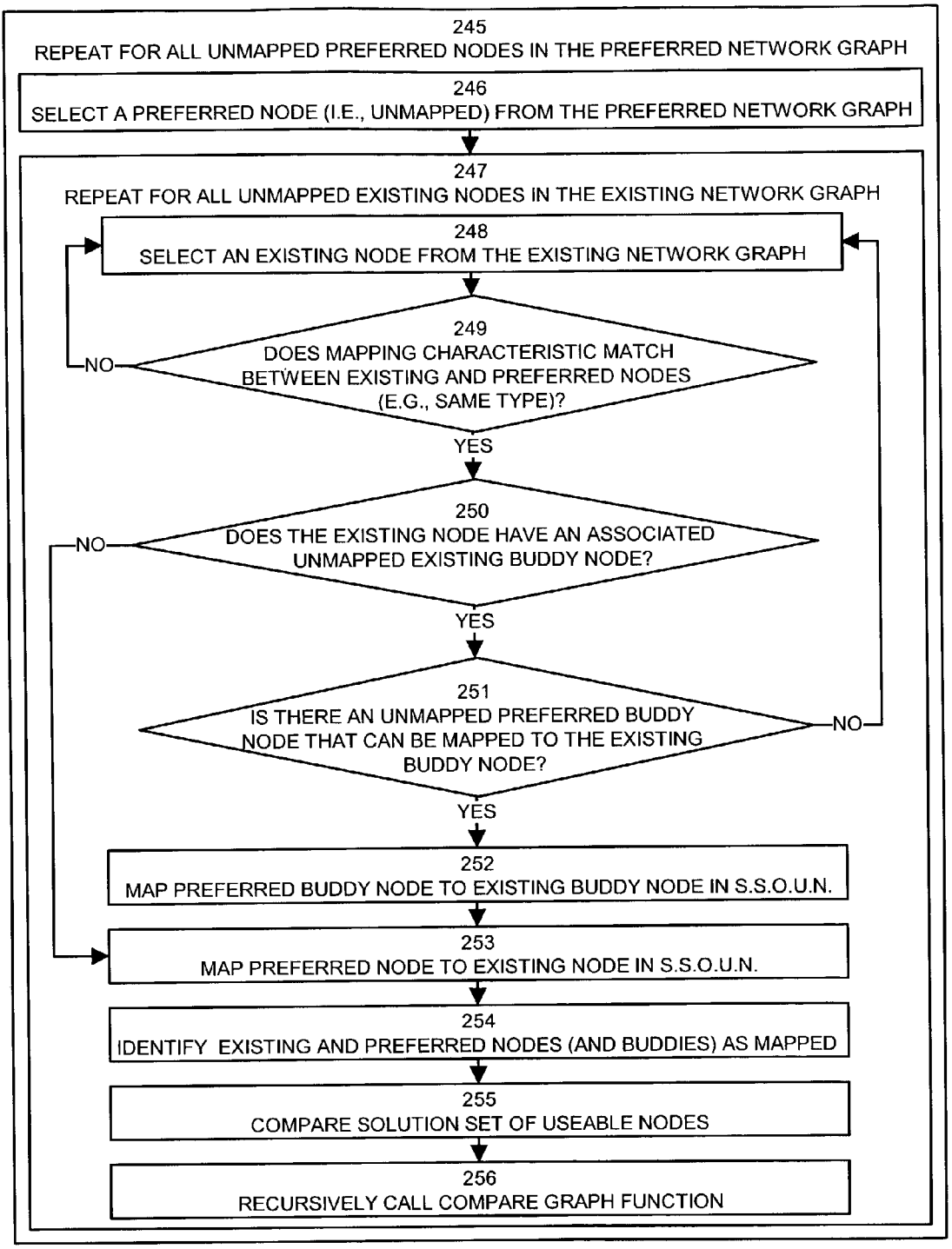
FIG. 8 is a flow chart of processing steps performed by a network analyzer to iteratively produce multiple solution sets of usable nodes by mapping preferred nodes to existing nodes according to one example embodiment of the invention.

FIG. 8 is a flow chart of processing steps performed by a network analyzer 130 configured according to one embodiment of the invention in order to produce usable network configurations 180. Generally, the processing steps shown in the flow chart in FIG. 8 correspond to the iterative mapping processing explained above with respect to steps 241 and the comparison processing of steps 242 and 243 in FIG. 7. In other words, processing steps shown in the flow chart in FIG. 8 allow the network analyzer to compare the interconnection relationships between nodes defined by the preferred network graph 110 to the existing interconnection relationships of nodes defined within the existing network topology 160.

Processing begins in step 245 at which point the network analyzer 130 enters a processing loop that repeats for any unmapped preferred nodes (i.e., the compute nodes or switch nodes 112 and 114) defined within the preferred network graph or topology 110. Recall from the previous discussion and illustration in FIG. 3 that the preferred network graph 110-1 defines a series of nodes as a set of vertices. The processing loop defined by step 245 occurs for each of these nodes 112-1 through 112-6 and 114-1 (i.e., is performed for all compute and switch nodes within the preferred network configuration 120).

In step 246 the network analyzer selects a preferred unmapped node from the preferred network graph 110-1. As will be explained shortly, as node interconnections are discovered within the existing and preferred graphs that match each other, the processing loops shown in FIG. 8 results in these node identifications being marked or otherwise identified as mapped. Initially, all preferred and existing nodes are considered unmapped. Thus upon the first iteration of the processing loop defined by step 245 however, no preferred or existing nodes are yet mapped to other nodes.

In step 247 the network analyzer 130 enters a processing loop that repeats for all unmapped existing nodes in the existing network graph or topology 160. This loop is similar to the loop defined by step 245 except that the loop in step 247 occurs for each unmapped node within the existing network topology 160.

In step 248 the network analyzer selects an existing node (i.e., selects a vertice) from the existing network graph 160. At this point, the network analyzer 130 has selected a particular preferred node and a particular existing node from the respective preferred and existing network graphs 110 and 160.

Next, in step 249, the network analyzer 130 determines if a mapping characteristic matches between the existing and preferred nodes selected in steps 246 and 248. In one embodiment of the invention, the type of node (i.e., compute node or switch node) selected defines the mapping characteristic. Accordingly, if the network analyzer 130 selects a preferred compute node in step 246 and selects an existing compute node in step 248, then each node is the same type (i.e., they are both compute nodes) and the mapping characteristic in step 249 for these selected nodes matches and processing proceeds to step 250. If, in step 249, the mapping characteristic between the two selected nodes did not match, processing returns to step 248 and to select the next existing node from the existing network graph 160. In other embodiments of the invention, the mapping characteristic may be defined as the type of node as well as the number of interconnections with other nodes. Thus, in step 249 a mapping characteristic of two nodes will match if the are the same type and contain the same number of interconnections to other nodes. In yet a further embodiment, a mapping characteristic might include the type of node (e.g. compute or switch) as well as the number of interconnections (e.g., one connection) as well as the type of nodes to which the selected node interconnects (e.g., connection to a switch node). In such an embodiment, all three requirements must be the same for each node (the preferred and existing) in order to the mapping characteristic to be met.

In step 250, the network analyzer 130 determines if the existing selected node has an associated unmapped existing buddy node. As noted above in the discussion of conventional systems, certain nodes that exist, for example, within a multi-processor computer systems such as an enterprise server may operate in a buddy relationship with another node. If this is the case, then each of these nodes are considered to be in a buddy relationship with each other. Accordingly, if the network analyzer 130 selects an existing node in step 248 from the existing network topology graph 160, the processing of step 250 causes the network analyzer 130 to determine if another node within the existing network topology 160 identifies itself (or is identified or otherwise references by the selected node) as being in a buddy relationship with the selected node. If the existing node does not have an unmapped existing buddy node, processing proceeds to step 253 to be explained shortly. However, if the existing selected node is in a buddy relationship with another existing and unmapped node, processing proceeds to step 251 to determine if there is a corresponding unmapped preferred buddy node within the preferred network topology 110 that can be mapped to the existing buddy node.

In other words, in step 251, once it has been determined that a particular selected existing node is a buddy relationship with another existing node, then the network analyzer 130 determine if there is an available unmapped preferred node that can be associated as a buddy with the selected preferred node the network analyzer 130 selects in step 246. If there is an unmapped available preferred buddy node that can be mapped to the existing buddy node, then processing proceeds to from step 251 to step 252.

In step 252, the network analyzer 130 maps the preferred buddy node to the existing buddy node within the solution set of usable nodes.

Next, in step 253 the network analyzer 130 maps the selected preferred node to the selected existing node within the solution set of usable nodes. In step 253 then, the network analyzer 130 has determined at this point in processing that the selected unmapped preferred node and selected unmapped existing node are of the same type (when node type is used as the mapping characteristic for nodes) and thus these nodes can be mapped to each other. In addition, in situations in which the selected existing node is in a buddy relationship with another existing node, the network analyzer 130 processes steps 251 and 252 in order to determine if there is an unmapped preferred node that can be configured into a buddy relationship with the selected preferred node. If there is an available unmapped preferred buddy node, then this node is also mapped to the existing buddy node in step 252. If no unmapped preferred buddy node is available then the selected preferred node is not mapped to the selected existing node and processing proceeds back to step 248 to select the next unmapped existing node. After processing step 253 then, the network analyzer 130 has created a mapping between at least the selected preferred node and the selected existing node and possibly between an associated existing buddy node (i.e., a buddy node of the selected existing node) and another preferred node chosen to be the buddy of the selected preferred node. By including buddy node mappings in this manner, embodiments of the invention ensure to protect the operational validity of the existing network configuration when selecting existing nodes for mapping to preferred nodes. Thus if an existing node requires operation with a buddy node, and a preferred node is attempted to be mapped to this existing node, there must be an another available (i.e., unmapped) preferred node that can serve as the buddy to the selected preferred node, or the selected node will not be mapped to the selected existing node.

Next, in step 254, the network analyzer identifies the existing and preferred nodes and any buddy nodes as being mapped, thus removing them from consideration for successive iterations of the loops defined by steps 245 and 247.

Next, in step 255, the network analyzer compares the solution set of usable nodes to determine if the solution set is a best match solution set. Processing details of step 255 will be explained shortly with respect to the flow chart shown in FIG. 9 which provides details of processing according to one embodiment of the invention for a network analyzer 130 to compare solution sets of usable nodes with each other to determine which solution set should be considered a best match solution set.

Next, in step 256 in FIG. 8, the network analyzer 130 recursively calls the processing in FIG. 8 (i.e., calls step 245 through 256). In other words, the flow chart of processing steps illustrated in FIG. 8 (i.e., the compare graph function defined by step 245 and all other steps in this figure) is recursive in nature. This allows multiple instances of this processing to take place concurrently in order to discover all possible solution sets of usable nodes that define usable network configurations within the existing network topology 160. Accordingly, upon recursively calling the compare graph function in step 256, an entirely new instantiation of the processing illustrated in FIG. 8 is performed using the current mapped and unmapped state of the preferred and existing network topologies 110 and 160 that contain mapped and/or unmapped nodes. In this manner, embodiments of the invention are able to produce each combination of usable network configurations. Thus, as the processing of FIG. 8 proceeds within each recursive iteration, a particular preferred node is attempted to be mapped to each instance of every existing node and the thus all preferred nodes are attempted to be mapped at least once to all existing nodes and once such a mapping is made, the process repeats itself using the current set of mapped nodes and unmapped nodes such that every permutation and combination of node interconnections within the existing network configuration are compared to the preferred network topology 110 in order to make every possible attempt at determining what portions of the existing network topology 160 are configured in a manner that is similar or exactly the same as the preferred network topology 110.

It is to be understood that the solution to the problem of matching the preferred network topology 110 to the existing network topology 160 can be assisted by applying graph matching techniques used in the field of mathematics in order to identify which portions of the existing network graph 160 match all or portions of the preferred network graph 110.

Figure 9:
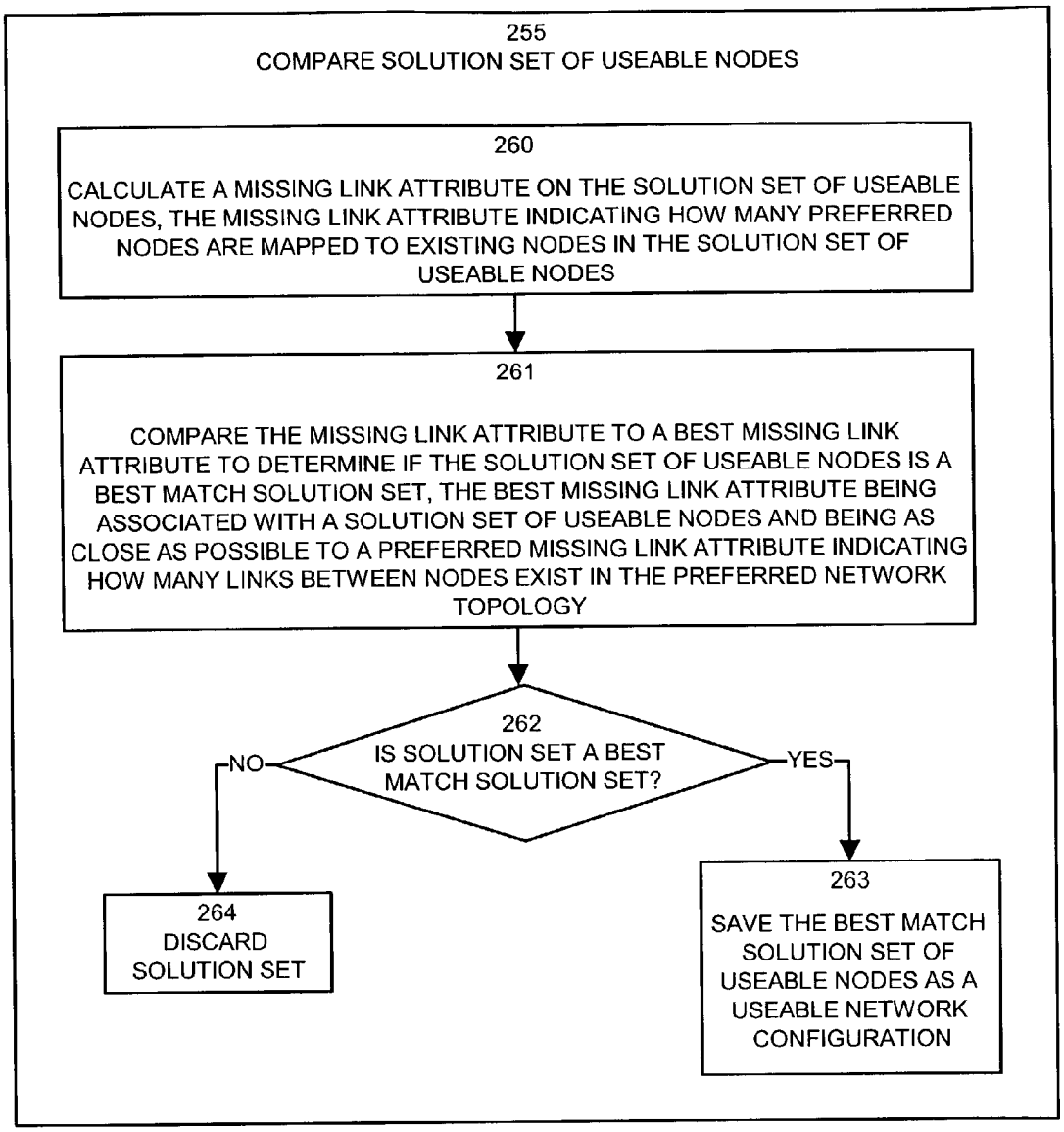
FIG. 9 is a flow chart of processing steps performed by a network analyzer to compare solution sets of usable nodes to determine which solution set defines a configurations of nodes within the existing network configuration that most closely matches the preferred network configuration according to one example embodiment of the invention.

FIG. 9 is a flow chart of processing steps which showed details of processing that the network analyzer 130 configured according to one embodiment of the invention performs within steps 242 and/or 243 in FIG. 7 and step 255 of FIG. 8 in order to compare solution sets of usable nodes to determine if the current solution set of mapped nodes identifies a set of existing network topology nodes that closely match the interconnections defined by the preferred network topology 110.

In particular, in step 260, the network analyzer 130 calculates a missing link attribute on the current solution set of usable nodes. Recall that the processing of step 255 is performed after each successful mapping operation. That is, during the processing of FIG. 8, as the network analyzer 130 identifies a particular existing node that is the same type (i.e., that has a matching mapping characteristic) as the selected preferred node, then this node is mapped to the preferred node. As more and more nodes with the existing network topology 160 are mapped in this manner (i.e., are determined to be of the same type and, if included in the mapping characteristic, have the same interconnection relationships as selected preferred nodes), then the solution set of usable nodes begins to contain a collection of existing nodes that (over multiple iterations of the processing of FIG. 8) come closer and closer to representing more and more node relationships defined in the preferred network apology 110. Accordingly, after each node is mapped in FIG. 8 and the network analyzer performs the processing of step 255, the network analyzer 130 calculates a missing link attribute of the solution set of useable nodes. In this example embodiment, the missing link attribute indicates how many preferred nodes are mapped to existing nodes in the solution set of useable nodes. The more nodes that are mapped in the current solution set of usable nodes, the lower the missing link attribute. In other words, if the current solution set of usable nodes identifies five existing nodes within the existing network configuration 150 that are mapped to five corresponding preferred nodes in the preferred network topology 110, then the missing link attribute can be calculated by determining the number of links in the preferred network topology 110 (e.g., seven links representing seven nodes in the example in FIG. 1) to the current number of links (i.e., mapped nodes) in the solution set of usable nodes (i.e., five current existing nodes that are mapped in this example) to produce a missing link attribute of two for the solution set of usable nodes as it currently exists for this iteration of the processing in step in FIG. 8. The missing link attribute thus indicates how many "pieces" of the preferred network configuration have not yet been mapped to pieces of the existing network configuration.

Next, in step 261, the network analyzer 130 compares the missing link attribute to a best missing link attribute to determine if the solution set of usable nodes is a best batch solution set. The best missing link attribute is associated with a solution set of useable nodes that may have been previously computed and is thus far the closest to a preferred missing link attribute that indicates how many links between nodes exist in the preferred network topology 110. In other words, as noted above, the preferred network topology 110 identifies a number of nodes desired by the administrator 140 that are interconnected in a certain manner that defines a number of links. This value is the best missing link attribute and identifies a best case match. As solution sets of usable nodes are produced during the iteration processing discussed above in FIG. 8, as each node is mapped in a particular solution set, step 260 calculates the current missing link attribute for that solution set at that point in time. This value is then compared in step 260 with the best missing link attribute. Based upon a predefined value which can, for example, the configured by the administrator 140, if the missing link attribute of the current solution set of usable nodes exceeds a predetermined threshold (i.e., is close to the best missing link attribute), then the current solution set of usable nodes may be considered one of the best match solution sets. This decision is made in step 262.

In step 262, the network analyzer 130 determines if the solution set of currently mapped existing nodes is a best match solution set. In other words, in step 262, the network analyzer determines if the missing link attribute associated with the current solution set of usable nodes is equal to or better than a cut off level or threshold which may be equal to or slightly less preferrable than the best missing link attribute associated with the preferred network apology. If the solution set is considered to be a best match solution set, processing proceeds to step 263.

In step 263, the network analyzer 130 saves the best match solution set of usable nodes as one of the usable network configurations 180. Alternatively, in step 262, if the missing link attribute identifies a significant number of missing links thus indicating that not very many existing nodes have been mapped to preferred nodes, then processing proceeds to step 264 at which point the network analyzer 130 discards the solution set of usable nodes since. In this manner, of all the solution set of usable nodes produced by the iterative processing of FIG. 8, each solution set can be compared based on a missing link attribute to the best missing link attribute derived from the preferred network topology to determine how closely the solution set of usable nodes matches the preferred network topology. Those solution sets that closely or exactly match the preferred network topology are saved as useable network configurations 180 and identify compute and switch node interconnections within the existing network configuration 150 that closely match the preferred network topology 110 desired by the administrator 140. In this manner, embodiments of the invention are able to produce all combinations of connectivity arrangements within the existing network configuration and are able to compare these nodes with preferred node identifiers in the preferred network topology 110 to produce possible combinations of mapping between preferred nodes and existing nodes. For each solution set produced, the network analyzer 130 calculates a missing link attribute which is then compared to the best missing link attribute defined by the preferred network topology 110. Those that closely match thus identify those configurations within the existing network configuration 150 that can be used to support operation of the preferred network apology 110.

Figure 10:
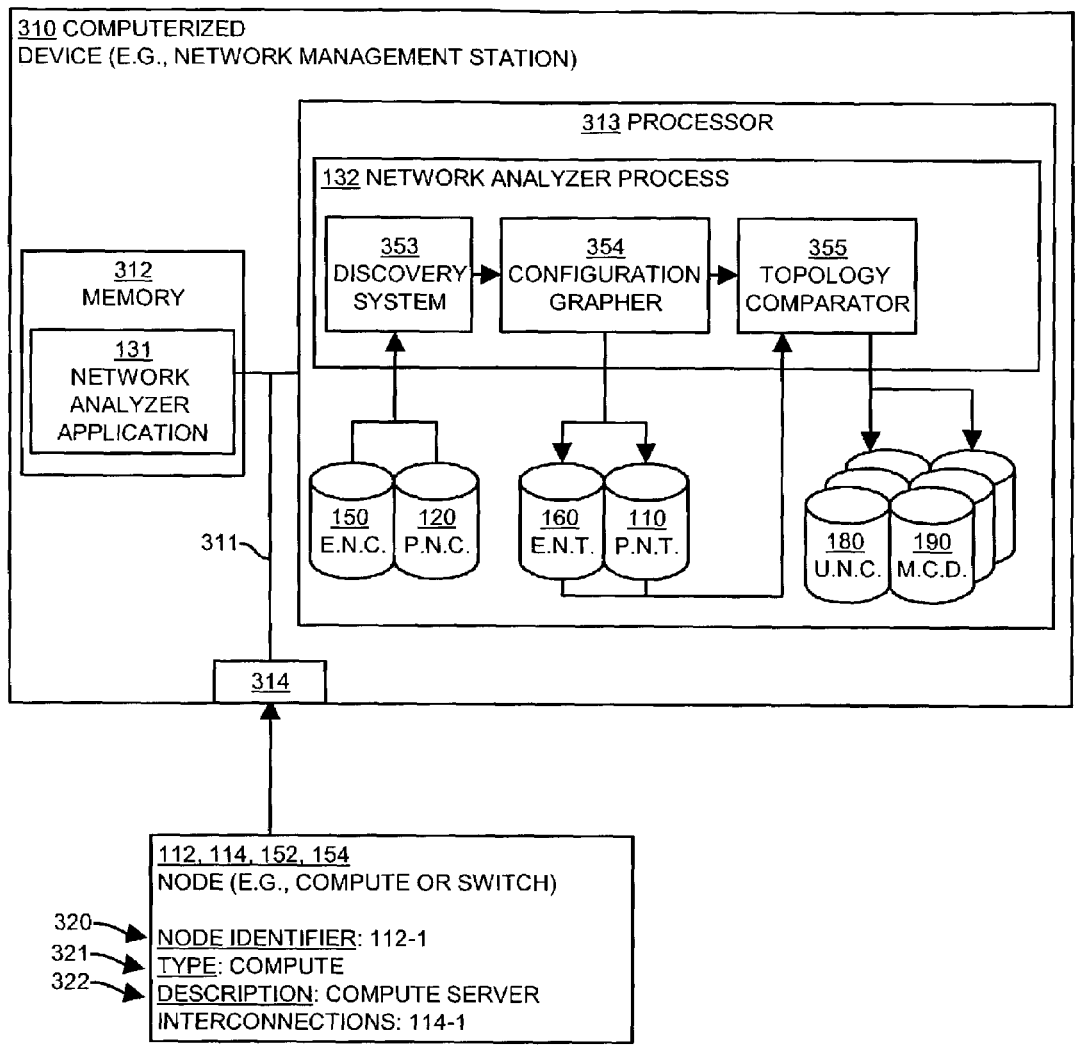
FIG. 10 illustrates an example architecture of a computerized device configured to operate a network analyzer application as a network analyzer process to perform processing of embodiments of the invention.

FIG. 10 illustrates an example of a computerized device 310 configured according to one example embodiment of the invention. The computerized device 310 includes an interconnection mechanism 311 such as a data bus or other circuitry that interconnects a processor 313 and a memory 312. The processor 313 may be any type of central processing unit, controller, microprocessor, or other circuitry that is capable of executing, interpreting, operating, being configured with, or otherwise performing sets of logic instructions such as computer program code. The memory 312 may be any type of computer readable medium such as electronic semiconductor memory (e.g., Random Access Memory or Read Only Memory) or another storage medium such magnetic or optical disk storage. The memory 312 (i.e., a computer readable medium) is encoded with a network analyzer application 131 that represents software code or logic instructions that, when executed, interpreted, or otherwise performed by the processor 313 create a network analyzer process 132. The previously described network analyzer 130 is represented in FIG. 10 by either one or both of the network analyzer process 132 and network analyzer application 131.

The network analyzer process includes a discovery system 353 that can read the exiting network configuration 150 and preferred network configuration 120 to determine nodes and interconnections between nodes. This information is passed to a configuration grapher 354 that produces the existing network topology 160 and the preferred network topology 110. A topology comparator 355 can receive and compare the existing network topology 160 against the preferred network topology 110 as explained above to produce the useable network configuration(s) 180 as well as the missing configuration data 190.

Also illustrated in FIG. 10 is an example node 112, 114, 152 or 154. The node includes a node identifier 320, a node type 321, a node description 322 and an interconnection list 323. The discovery system 353 in the network analyzer process 132 can query this information from each node in the existing network configuration 150 during the processing explained above to identify other nodes linked or interconnected to this node.

It is to be understood that there can be many variations to the aforementioned embodiments that are meant to be included within the scope of this invention. For example, network configurations are not limited to including only switch and compute nodes. Any type of component can be included in a network configuration. The scope of this invention is intended to be cover such variations. As such, the foregoing description of embodiments of the invention are not intended to be the limiting. Rather, any limitations to the invention are presented in the following claims.

What is claimed is:

1. A method for identifying a useable network configuration, the method comprising the step of:
   receiving a preferred network configuration defining a preferred network topology;

analyzing an existing network configuration to produce an existing network topology;

comparing the preferred network topology to the existing network topology to identify a useable network configuration within the existing network configuration that most closely supports operation of the preferred network configuration, further including applying a graph matching technique to compare the preferred network graph to the existing network graph to identify at least one useable network configuration corresponding to a set of existing interconnected nodes in the existing graph that most closely correspond to preferred nodes in the preferred network graph, the at least one useable network configuration indicating which existing nodes can support operation of the preferred network configuration within the existing network configuration, applying a graph matching technique to compare the preferred network graph to the existing network graph further comprising:

iteratively mapping node combinations from the preferred network graph and the existing network graph based on corresponding node mapping characteristics to produce a solution set of usable nodes; and comparing a configuration characteristic of the solution set of useable nodes to a best match configuration characteristic derived from the preferred network graph to determine if the solution set of useable nodes is a best match solution set of useable nodes, and if so, saving the best match solution set of useable nodes as a useable network configuration;

wherein the step of applying a graph matching technique comprises the step of:

selecting a preferred node from the preferred network graph;

selecting an existing node from the existing network graph;

determining, based on node mapping characteristics, if the existing node matches the preferred node, and if so:
  i) creating a mapping between the preferred node and the existing node in a solution set of useable nodes; and
  ii) identifying the preferred node and the existing node as mapped nodes;
  iii) comparing the solution set of useable nodes using a best solution metric to determine if the solution set of useable nodes is a preferred solution set of useable nodes, and if so, saving the solution set of useable nodes in a set of preferred solution sets of useable nodes;

repeating, in a first repeat sequence, the steps of selecting an existing node and determining if the existing node matches the preferred node for all unmapped existing nodes in the existing network graph; and repeating, in a second repeat sequence, the steps of selecting a preferred node, selecting an existing node, and repeating in the first repeat sequence for all preferred nodes in the preferred network.

2. The method of claim 1 wherein:

the step of receiving a preferred network configuration defining a preferred network topology comprises the step of producing a preferred network graph of nodes defining the preferred network topology;

the step of analyzing an existing network configuration to produce an existing network topology comprises the step of producing an existing network graph of nodes defining the existing network topology.

3. The method of claim 2 wherein the step of receiving a preferred network configuration defining a preferred network topology comprises the steps of:

receiving a set of compute node identifiers, each compute node identifier identifying a respective compute node to process data in the preferred network configuration;

receiving a set of switch node identifiers, each switch node identifier identifying a respective switch node capable of interconnecting compute nodes identified by respective compute node identifiers in the set of compute node identifiers;

receiving at least one interconnect requirement indicating how at least one compute node is to be connected to at least one switch node; and wherein the step of producing a preferred network graph of nodes defining the preferred network topology comprises the step of producing at least one preferred network graph defining, according to the at least one interconnect requirement, a possible interconnection between compute nodes identified in the set of compute nodes and switch nodes identified in the set of switch nodes.

4. The method of claim 2 wherein the step of producing a preferred network graph of nodes defining the preferred network topology comprises the step of:

confirming an operational validity of the interconnection between compute nodes and switch nodes defined in the at least one preferred network topology.

5. The method of claim 2 wherein the step of analyzing an existing network configuration to produce an existing network topology comprises the steps of:

querying the existing network configuration to identify a set of existing compute nodes operating within the existing network configuration;

querying the existing network configuration to identify a set of existing switch nodes operating within the existing network configuration; and for each existing compute node and each existing switch node identified in the existing network configuration, performing the steps of:
  identifying existing interconnections to at least one of an existing switch node and an existing compute node operating in the existing network configuration; and
  storing the existing interconnections within the existing network topology.

6. The method of claim 2 wherein the step of iteratively mapping node combinations from the preferred network graph and the existing network graph based on corresponding node mapping characteristics comprises the step of:

determining if a node type of a preferred network node matches a node type of an existing network node, and so, creating a mapping between the preferred network node and the existing network node within the solution set of useable nodes; and wherein the step of comparing a configuration characteristic of the solution set of useable nodes to a best match configuration characteristic derived from the preferred network graph comprises the step of:

comparing a number of mapped node links in the solution set of useable nodes to a number of mapped node links in the preferred network graph to determine how closely mapped the solution set of useable nodes is to the preferred network graph.

7. The method of claim 2 wherein the step of iteratively mapping node combinations from the preferred network graph and the existing network graph based on corresponding node mapping characteristics comprises the steps of:
  selecting a preferred node within the preferred network graph;
  selecting an existing node within the existing network graph for which a node mapping characteristic matches the selected preferred node;
  detecting that the existing node is associated with an unmapped existing buddy node; and
  determining if an unmapped preferred buddy node can be mapped to the unmapped existing buddy node, and if so, mapping the preferred node to the existing node within the solution set of useable nodes and mapping the preferred buddy node to the existing buddy node within the solution set of useable nodes.

8. The method of claim 7 wherein the existing buddy node represents an existing node within the existing network graph that must be mapped in conjunction with the selected existing node that matches a selected preferred node in order to allow the preferred network configuration to operate properly within the existing network configuration.

9. The method of claim 2 wherein the step of iteratively mapping node combinations comprises the step of producing multiple solution sets of useable nodes that are determined to be a best match solution set of useable nodes, each defining a useable network configuration within the existing network configuration that will support operation of the preferred network configuration.

10. The method of claim 9 wherein the step of comparing the preferred network topology to the existing network topology comprises the step of:
  identifying useable network configurations of existing nodes in the existing network topology that most closely match node configurations within the preferred network topology.

11. The method of claim 2 wherein the step of comparing the preferred network topology to the existing network topology comprises the step of:
  comparing the useable network configuration to the preferred network configuration to identify a set of missing nodes and node interconnections within the preferred network configuration that do not exist within the useable network configuration, the set of missing nodes and node interconnections indicating modifications required to be made to the existing network configuration to support operation of the preferred network configuration.

12. The method of claim 2 wherein the step of comparing the solution set of useable nodes to a best solution metric to determine if the solution set of useable nodes is a preferred solution set of useable nodes comprises the steps of:
  calculating a missing link attribute on the solution set of useable nodes, the missing link attribute indicating how many preferred nodes are mapped to existing nodes in the solution set of useable nodes; and
  comparing the missing link attribute to a best missing link attribute, the best missing link attribute being associated with a solution set of useable nodes and being as close as possible to a preferred missing link attribute indicating how many links between nodes exist in the preferred network topology.

13. The method of claim 1 wherein the step of receiving a preferred network configuration defining a preferred network topology comprises the step of:
  obtaining interconnection relationships between preferred compute nodes and preferred switch nodes defined in the preferred network configuration to produce a preferred network graph of nodes defining the preferred network topology; and
  wherein the step of analyzing an existing network configuration to produce an existing network topology comprises the steps of:
    querying at least one of a set of existing compute nodes and a set of existing switch nodes operating in the existing network configuration to detect existing interconnection relationships between compute nodes and switch nodes operating in the existing network configuration; and
    producing an existing network graph of nodes reflecting the existing interconnection relationships between existing compute nodes and existing switch nodes to define the existing network topology.

14. The method of claim 1 wherein:
  the existing network configuration defines a set of compute nodes and switch nodes operating as respective processors over an interconnection fabric within a multi-processor computerized device; and
  wherein the useable network configuration identified in the step of comparing identifies an arrangement of interconnected compute nodes in the existing network configuration that are interconnected with the interconnection fabric in a manner that most closely resembles an interconnection of preferred compute nodes in the preferred network configuration.

15. The method of claim 1 wherein the step of comparing comprises the steps of:
  creating mappings between preferred nodes within the preferred network topology to existing nodes with the existing network topology to develop a solution set of useable nodes in the existing network configuration;
  detecting that an existing node has an associated unmapped existing buddy node in the existing network configuration; and
  determining if an unmapped preferred buddy node in the preferred network configuration can be mapped to the unmapped existing buddy node, and if so, creating the mapping between the unmapped preferred buddy node to the existing buddy node within the solution set of useable nodes.

16. A computerized device comprising:
  an interface;
  a memory;
  a processor;
  an interconnection mechanism coupling the interface, the memory and the processor;
  wherein the memory is encoded with a network analyzer application that when performed by the processor, produces a network analyzer process that causes the computer system to identify a useable network configuration by performing the processing steps of:
    receiving, into the memory via the interface, a preferred network configuration defining a preferred network topology;
    analyzing an existing network configuration to produce an existing network topology in the memory; and
    comparing, in the processor, the preferred network topology to the existing network topology to identify a useable network configuration within the existing network configuration that most closely supports operation of the preferred network configuration such that when the network analyzer process causes the processor to perform the step of comparing the preferred network topology to the existing network topology, the network analyzer process causes the processor to perform the step of applying a graph matching technique to compare the preferred network graph to the existing network graph to identify at least one useable network configuration corresponding to a set of existing interconnected nodes in the existing graph that most closely correspond to preferred nodes in the preferred network graph, the at least one useable network configuration indicating which existing nodes can support operation of the preferred network configuration within the existing network configuration, wherein when the network analyzer process causes the processor to perform the step of applying a graph matching technique, the network analyzer process causes the processor to perform the step of:

selecting a preferred node from the preferred network graph;

selecting an existing node from the existing network graph;

determining, based on node mapping characteristics, if the existing node matches the preferred node, and if so:
  i) creating a mapping between the preferred node and the existing node in a solution set of useable nodes; and
  ii) identifying the preferred node and the existing node as mapped nodes;
  iii) comparing the solution set of useable nodes using a best solution metric to determine if the solution set of useable nodes is a preferred solution set of useable nodes, and if so, saving the solution set of useable nodes in a set of preferred solution sets of useable nodes;

repeating, in a first repeat sequence, the steps of selecting an existing node and determining if the existing node matches the preferred node for all unmapped existing nodes in the existing network graph; and repeating, in a second repeat sequence, the steps of selecting a preferred node, selecting an existing node, and repeating in the first repeat sequence for all preferred nodes in the preferred network graph.

17. The computerized device of claim 16 wherein:

when the network analyzer process causes the processor to perform the step of receiving a preferred network configuration defining a preferred network topology, the network analyzer process causes the processor to perform the step of producing a preferred network graph of nodes defining the preferred network topology;

when the network analyzer process causes the processor to perform the step of analyzing an existing network configuration to produce an existing network topology, the network analyzer process causes the processor to perform the step of producing an existing network graph of nodes defining the existing network topology.

18. The computerized device of claim 17 wherein when the network analyzer process causes the processor to perform the step of receiving a preferred network configuration defining a preferred network topology, the network analyzer process causes the processor to perform the steps of:

receiving a set of compute node identifiers, each compute node identifier identifying a respective compute node to process data in the preferred network configuration;

receiving a set of switch node identifiers, each switch node identifier identifying a respective switch node capable of interconnecting compute nodes identified by respective compute node identifiers in the set of compute node identifiers;

receiving at least one interconnect requirement indicating how at least one compute node is to be connected to at least one switch node; and wherein when the network analyzer process causes the processor to perform the step of producing a preferred network graph of nodes defining the preferred network topology, the network analyzer process causes the processor to perform the step of producing at least one preferred network graph defining, according to the at least one interconnect requirement, a possible interconnection between compute nodes identified in the set of compute nodes and switch nodes identified in the set of switch nodes.

19. The computerized device of claim 17 wherein when the network analyzer process causes the processor to perform the step of producing a preferred network graph of nodes defining the preferred network topology, the network analyzer process causes the processor to perform the step of:

confirming an operational validity of the interconnection between compute nodes and switch nodes defined in the at least one preferred network topology.

20. The computerized device of claim 17 wherein when the network analyzer process causes the processor to perform the step of analyzing an existing network configuration to produce an existing network topology, the network analyzer process causes the processor to perform the step of:

querying the existing network configuration to identify a set of existing compute nodes operating within the existing network configuration;

querying the existing network configuration to identify a set of existing switch nodes operating within the existing network configuration; and for each existing compute node and each existing switch node identified in the existing network configuration, performing the steps of:
  identifying existing interconnections to at least one of an existing switch node and an existing compute node operating in the existing network configuration; and
  storing the existing interconnections within the existing network topology.

21. The computerized device of claim 17 wherein when the network analyzer process causes the processor to perform the step of applying a graph matching technique to compare the preferred network graph to the existing network graph, the network analyzer process causes the processor to perform the steps of:

iteratively mapping node combinations from the preferred network graph and the existing network graph based on corresponding node mapping characteristics to produce a solution set of usable nodes; and comparing a configuration characteristic of the solution set of useable nodes to a best match configuration characteristic derived from the preferred network graph to determine if the solution set of useable nodes is a best match solution set of useable nodes, and if so, saving the best match solution set of useable nodes as a useable network configuration.

22. The computerized device of claim 21 wherein when the network analyzer process causes the processor to perform the step of iteratively mapping node combinations from the preferred network graph and the existing network graph based on corresponding node mapping characteristics, the network analyzer process causes the processor to perform the step of:

determining if a node type of a preferred network node matches a node type of an existing network node, and so, creating a mapping between the preferred network node and the existing network node within the solution set of useable nodes; and wherein when the network analyzer process causes the processor to perform the step of comparing a configuration characteristic of the solution set of useable nodes to a best match configuration characteristic derived from the preferred network graph, the network analyzer process causes the processor to perform the step of:

comparing a number of mapped node links in the solution set of useable nodes to a number of mapped node links in the preferred network graph to determine how closely mapped the solution set of useable nodes is to the preferred network graph.

23. The computerized device of claim 21 wherein when the network analyzer process causes the processor to perform the step of iteratively mapping node combinations from the preferred network graph and the existing network graph based on corresponding node mapping characteristics, the network analyzer process causes the processor to perform the steps of:

selecting a preferred node within the preferred network graph;

selecting an existing node within the existing network graph for which a node mapping characteristic matches the selected preferred node;

detecting that the existing node is associated with an unmapped existing buddy node; and determining if an unmapped preferred buddy node can be mapped to the unmapped existing buddy node, and if so, mapping the preferred node to the existing node within the solution set of useable nodes and mapping the preferred buddy node to the existing buddy node within the solution set of useable nodes.

24. The computerized device of claim 23 wherein the existing buddy node represents an existing node within the existing network graph that must be mapped in conjunction with the selected existing node that matches a selected preferred node in order to allow the preferred network configuration to operate properly within the existing network configuration.

25. The computerized device of claim 21 wherein when the network analyzer process causes the processor to perform the step of iteratively mapping node combinations, the network analyzer process causes the processor to perform the step of producing multiple solution sets of useable nodes that are determined to be a best match solution set of useable nodes, each defining a useable network configuration within the existing network configuration that will support operation of the preferred network configuration.

26. The computerized device of claim 25 wherein when the network analyzer process causes the processor to perform the step of comparing the preferred network topology to the existing network topology, the network analyzer process causes the processor to perform the step of:

identifying useable network configurations of existing nodes in the existing network topology that most closely match node configurations within the preferred network topology.

27. The computerized device of claim 21 wherein when the network analyzer process causes the processor to perform the step of comparing the preferred network topology to the existing network topology, the network analyzer process causes the processor to perform the step of:

comparing the useable network configuration to the preferred network configuration to identify a set of missing nodes and node interconnections within the preferred network configuration that do not exist within the useable network configuration, the set of missing nodes and node interconnections indicating modifications required to be made to the existing network configuration to support operation of the preferred network configuration.

28. The computerized device of claim 16 wherein when the network analyzer process causes the processor to perform the step of comparing the solution set of useable nodes to a best solution metric to determine if the solution set of useable nodes is a preferred solution set of useable nodes, the network analyzer process causes the processor to perform the steps of:

calculating a missing link attribute on the solution set of useable nodes, the missing link attribute indicating how many preferred nodes are mapped to existing nodes in the solution set of useable nodes; and comparing the missing link attribute to a best missing link attribute, the best missing link attribute being associated with a solution set of useable nodes and being as close as possible to a preferred missing link attribute indicating how many links between nodes exist in the preferred network topology.

29. The computerized device of claim 16 wherein when the network analyzer process causes the processor to perform the step of receiving a preferred network configuration defining a preferred network topology the network analyzer process causes the processor to perform the step of:

obtaining interconnection relationships between preferred compute nodes and preferred switch nodes defined in the preferred network configuration to produce a preferred network graph of nodes defining the preferred network topology; and wherein when the network analyzer process causes the processor to perform the step of analyzing an existing network configuration to produce an existing network topology the network analyzer process causes the processor to perform the steps of:

querying at least one of a set of existing compute nodes and a set of existing switch nodes operating in the existing network configuration to detect existing interconnection relationships between compute nodes and switch nodes operating in the existing network configuration; and producing an existing network graph of nodes reflecting the existing interconnection relationships between existing compute nodes and existing switch nodes to define the existing network topology.

30. The computerized device of claim 16 wherein:

the existing network configuration defines a set of compute nodes and switch nodes operating as respective processors over an interconnection fabric within a multi-processor computerized device; and wherein the useable network configuration identified in the step of comparing identifies an arrangement of interconnected compute nodes in the existing network configuration that are interconnected with the interconnection fabric in a manner that most closely resembles an interconnection of preferred compute nodes in the preferred network configuration.

31. The computerized device of claim 16 wherein when the network analyzer process causes the processor to perform the step of comparing, the network analyzer process causes the processor to perform the steps of:

creating mappings between preferred nodes within the preferred network topology to existing nodes with the existing network topology to develop a solution set of useable nodes in the existing network configuration;

detecting that an existing node has an associated unmapped existing buddy node in the existing network configuration; and determining if an unmapped preferred buddy node in the preferred network configuration can be mapped to the unmapped existing buddy node, and if so, creating the mapping between the unmapped preferred buddy node to the existing buddy node within the solution set of useable nodes.

32. A method for identifying a useable network configuration, the method comprising the steps of:

receiving a preferred network configuration defining a preferred network topology by producing a preferred network graph of nodes defining the preferred network topology;

analyzing an existing network configuration to produce an existing network topology; and comparing the preferred network topology to the existing network topology to identify a useable network configuration within the existing network configuration that most closely supports operation of the preferred network configuration, further comprising applying a graph matching technique to compare the preferred network graph to the existing network graph to identify at least one useable network configuration corresponding to a set of existing interconnected nodes in the existing graph that most closely correspond to preferred nodes in the preferred network graph, the at least one useable network configuration indicating which existing nodes can support operation of the preferred network configuration within the existing network configuration, the step of receiving a preferred network configuration defining a preferred network topology comprising the steps of:

receiving a set of compute node identifiers, each compute node identifier identifying a respective compute node to process data in the preferred network configuration;

receiving a set of switch node identifiers, each switch node identifier identifying a respective switch node capable of interconnecting compute nodes identified by respective compute node identifiers in the set of compute node identifiers;

receiving at least one interconnect requirement indicating how at least one compute node is to be connected to at least one switch node; and wherein the step of producing a preferred network graph of nodes defining the preferred network topology comprises the step of producing at least one preferred network graph defining, according to the at least one interconnect requirement, a possible interconnection between compute nodes identified in the set of compute nodes and switch nodes identified in the set of switch nodes;

the step of applying a graph matching technique to compare the preferred network graph to the existing network graph further comprising:

iteratively mapping node combinations from the preferred network graph and the existing network graph based on corresponding node mapping characteristics to produce a solution set of usable nodes; and comparing a configuration characteristic of the solution set of useable nodes to a best match configuration characteristic derived from the preferred network graph to determine if the solution set of useable nodes is a best match solution set of useable nodes, and if so, saving the best match solution set of useable nodes as a useable network configuration;

wherein the step of applying a graph matching technique comprises the step of:

selecting a preferred node from the preferred network graph;

selecting an existing node from the existing network graph;

determining, based on node mapping characteristics, if the existing node matches the preferred node, and if so:

i) creating a mapping between the preferred node and the existing node in a solution set of useable nodes; and ii) identifying the preferred node and the existing node as mapped nodes;

iii) comparing the solution set of useable nodes using a best solution metric to determine if the solution set of useable nodes is a preferred solution set of useable nodes, and if so, saving the solution set of useable nodes in a set of preferred solution sets of useable nodes;

repeating, in a first repeat sequence, the steps of selecting an existing node and determining if the existing node matches the preferred node for all unmapped existing nodes in the existing network graph; and repeating, in a second repeat sequence, the steps of selecting a preferred node, selecting an existing node, and repeating in the first repeat sequence for all preferred nodes in the preferred network.

33. The method of claim 32 wherein the step of iteratively mapping node combinations from the preferred network graph and the existing network graph based on corresponding node mapping characteristics comprises the steps of:

selecting a preferred node within the preferred network graph;

selecting an existing node within the existing network graph for which a node mapping characteristic matches the selected preferred node;

detecting that the existing node is associated with an unmapped existing buddy node; and determining if an unmapped preferred buddy node can be mapped to the unmapped existing buddy node, and if so, mapping the preferred node to the existing node within the solution set of useable nodes and mapping the preferred buddy node to the existing buddy node within the solution set of useable nodes.

* * * * *